United States Patent
Walker et al.

(10) Patent No.: US 12,145,546 B1
(45) Date of Patent: Nov. 19, 2024

(54) VEHICLE WASH SYSTEM FOR WASHING A VEHICLE WHILE THE CAR IS DRIVEN THROUGH THE VEHICLE WASHING SYSTEM

(71) Applicant: National Carwash Solutions, Inc., Grimes, IA (US)

(72) Inventors: Christopher Dennis Walker, West Des Moines, IA (US); Jose G. Avendano, Rockwall, TX (US); Beau Joseph Hunt, Ankeny, IA (US)

(73) Assignee: National Carwash Solutions, Inc., Grimes, IA (US)

( * ) Notice: Subject to any disclaimer, the term of this patent is extended or adjusted under 35 U.S.C. 154(b) by 10 days.

(21) Appl. No.: 17/321,873

(22) Filed: May 17, 2021

Related U.S. Application Data

(60) Provisional application No. 63/025,798, filed on May 15, 2020.

(51) Int. Cl.
*B60S 3/06* (2006.01)
*B60S 3/00* (2006.01)

(52) U.S. Cl.
CPC .............. *B60S 3/063* (2013.01); *B60S 3/004* (2013.01)

(58) Field of Classification Search
CPC ....................................................... B60S 3/063
See application file for complete search history.

(56) References Cited

U.S. PATENT DOCUMENTS

| | | | | |
|---|---|---|---|---|
| 3,570,034 A | * | 3/1971 | Lanfrankie | B60S 3/063 15/DIG. 2 |
| 3,747,151 A | * | 7/1973 | Takeuchi | B60S 3/063 15/53.2 |
| 3,764,383 A | * | 10/1973 | McBurnett | B60S 3/063 134/6 |
| 3,840,931 A | | 10/1974 | Bivens | |
| 3,852,842 A | * | 12/1974 | Weigele | B60S 3/063 15/DIG. 2 |

(Continued)

FOREIGN PATENT DOCUMENTS

| | | |
|---|---|---|
| DE | 4025413 A1 * | 2/1992 |
| DE | 4025413 C2 | 6/1992 |

(Continued)

*Primary Examiner* — Michael E Barr
*Assistant Examiner* — Omair Chaudhri
(74) *Attorney, Agent, or Firm* — Nyemaster Goode P.C.

(57) ABSTRACT

An apparatus to wash a vehicle that typically includes: a trolley frame having a first support beam and a second support beam, the trolley frame defining a first reference frame; a first translation beam extending from the first support beam to the second support beam, where the first translation beam is at an angle with respect to the first reference frame; a second translation beam extending from the first support beam to the second support beam, where the second translation beam is at an angle with respect to the first reference frame; a first brush extending downward from a first trolley, the first trolley movably disposed on the first translation beam; and a second brush extending downwardly from a second trolley, the second trolley movably disposed on the second translation beam. The second trolley typically moves independently from the first trolley using different and independent drive systems or motors.

15 Claims, 21 Drawing Sheets

CARRIAGE SPEED REQ'D = CAR MAX SPEED/SIN (ANGLE)

(56) References Cited

U.S. PATENT DOCUMENTS

| | | | | |
|---|---|---|---|---|
| 3,881,208 | A * | 5/1975 | Miner | B60S 3/063 15/DIG. 2 |
| 4,001,907 | A * | 1/1977 | Capra | B60S 3/06 15/53.2 |
| 4,225,995 | A | 10/1980 | Ennis | |
| 4,299,003 | A | 11/1981 | Ennis | |
| 4,332,625 | A | 6/1982 | Ennis | |
| 4,354,291 | A | 10/1982 | Ennis | |
| 4,495,667 | A | 1/1985 | Roncaglione et al. | |
| 4,622,710 | A * | 11/1986 | Stothart | B60S 3/06 15/53.2 |
| 4,689,749 | A * | 8/1987 | Glogowski | B60S 3/06 15/316.1 |
| 4,713,872 | A | 12/1987 | Muller | |
| 4,769,868 | A * | 9/1988 | Pagnanelli | B60S 3/06 15/DIG. 2 |
| 4,777,688 | A * | 10/1988 | Seamster, Jr. | B60S 3/06 15/53.2 |
| 4,802,803 | A | 2/1989 | Muller | |
| 5,177,825 | A | 1/1993 | Belanger et al. | |
| 5,325,559 | A | 7/1994 | Belanger et al. | |
| 5,901,398 | A * | 5/1999 | Ishikawa | B60S 3/004 104/165 |
| 6,264,754 | B1 * | 7/2001 | Bowman | B60S 3/063 134/6 |
| 10,793,117 | B1 * | 10/2020 | Gesy | B08B 1/04 |
| 2006/0218734 | A1 * | 10/2006 | Prater | B60S 3/063 15/53.2 |
| 2007/0028406 | A1 * | 2/2007 | MacNeil | B60S 3/06 15/53.2 |
| 2007/0151054 | A1 * | 7/2007 | MacNeil | B60S 3/066 15/53.1 |
| 2007/0174981 | A1 * | 8/2007 | Smith | B60S 3/06 15/53.2 |
| 2007/0277858 | A1 * | 12/2007 | Soria | B60S 3/04 134/63 |
| 2012/0124761 | A1 * | 5/2012 | Ennis | B60S 3/063 15/53.3 |
| 2013/0220369 | A1 * | 8/2013 | Wimmer | B60S 3/063 15/53.1 |
| 2014/0224279 | A1 * | 8/2014 | Anderson | B60S 3/063 134/18 |
| 2018/0281752 | A1 * | 10/2018 | Detrick | B08B 1/04 |
| 2019/0176774 | A1 * | 6/2019 | Belanger | A46B 15/0004 |

FOREIGN PATENT DOCUMENTS

| | | | | |
|---|---|---|---|---|
| DE | 19524748 | A1 * | 1/1997 | B60S 3/063 |
| DE | 102006051593 | A1 * | 5/2007 | B60S 3/063 |
| EP | 0103222 | B1 * | 5/1986 | |
| EP | 1106457 | A2 | 6/2001 | |
| EP | 1767418 | A2 * | 3/2007 | B60S 3/04 |
| EP | 2500219 | B1 * | 11/2019 | B60S 3/002 |
| JP | 2005007980 | A * | 1/2005 | |
| JP | 2008105476 | A * | 5/2008 | |
| KR | 200189935 | Y1 * | 7/2000 | |
| WO | 9403348 | A2 | 2/1994 | |

* cited by examiner

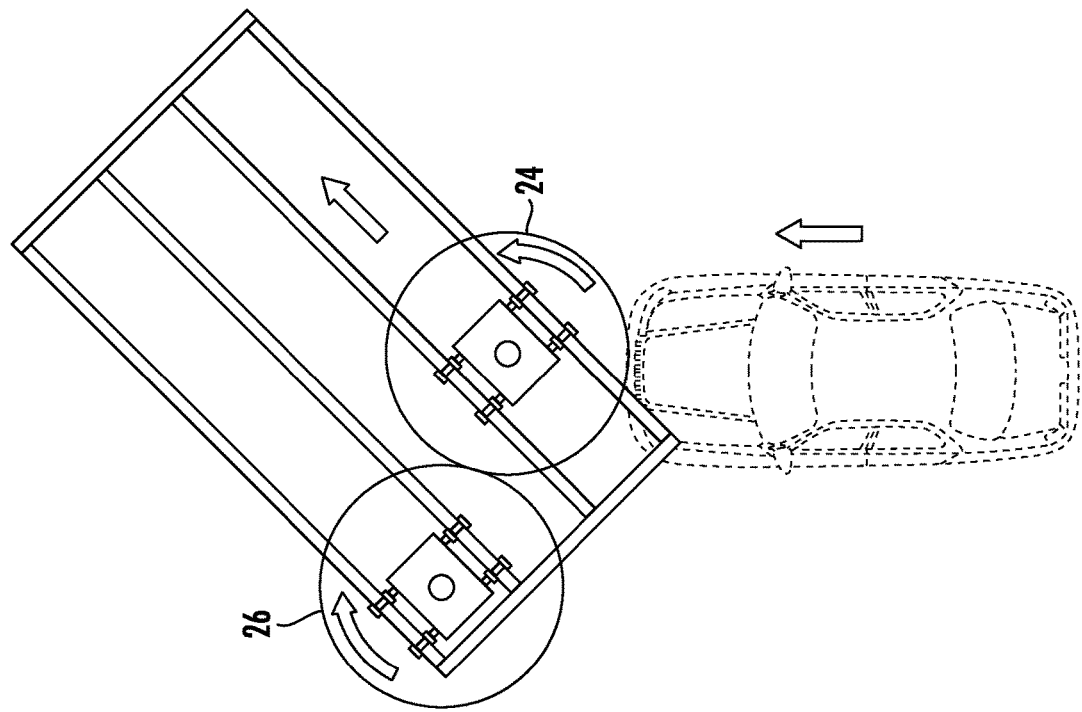
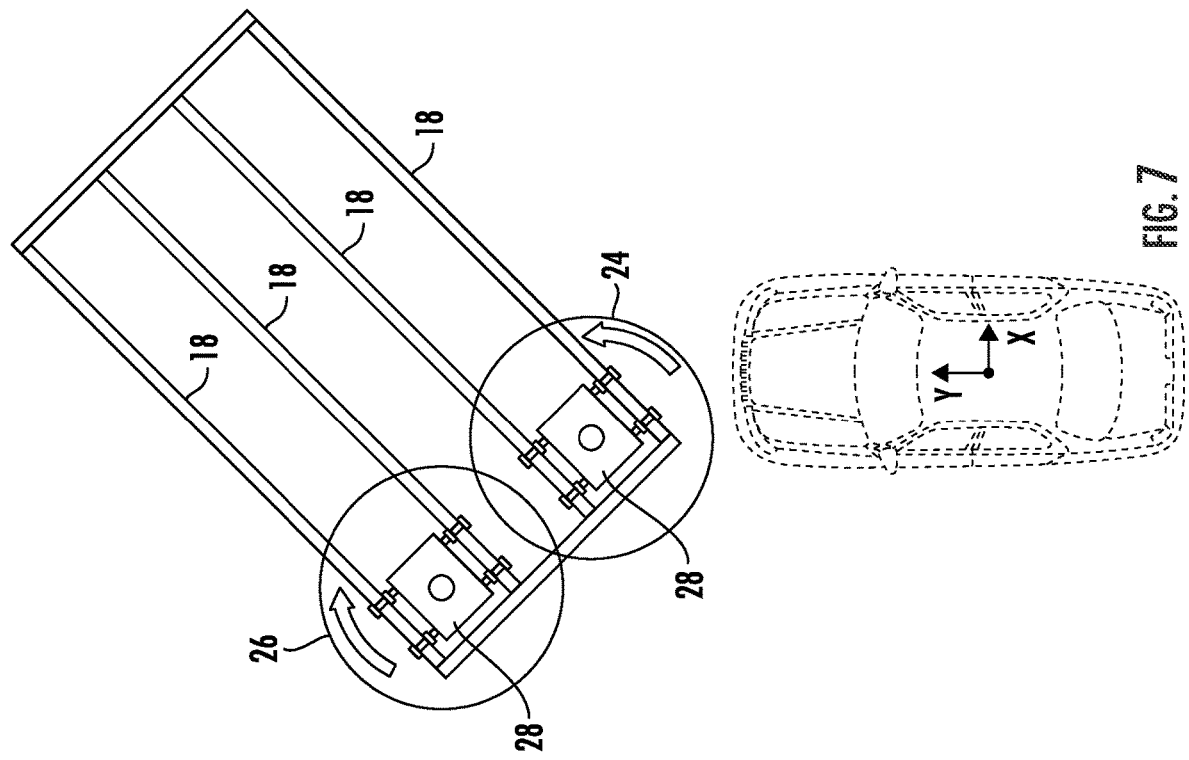

CARRIAGE SPEED REQ'D = CAR MAX SPEED/SIN (ANGLE)

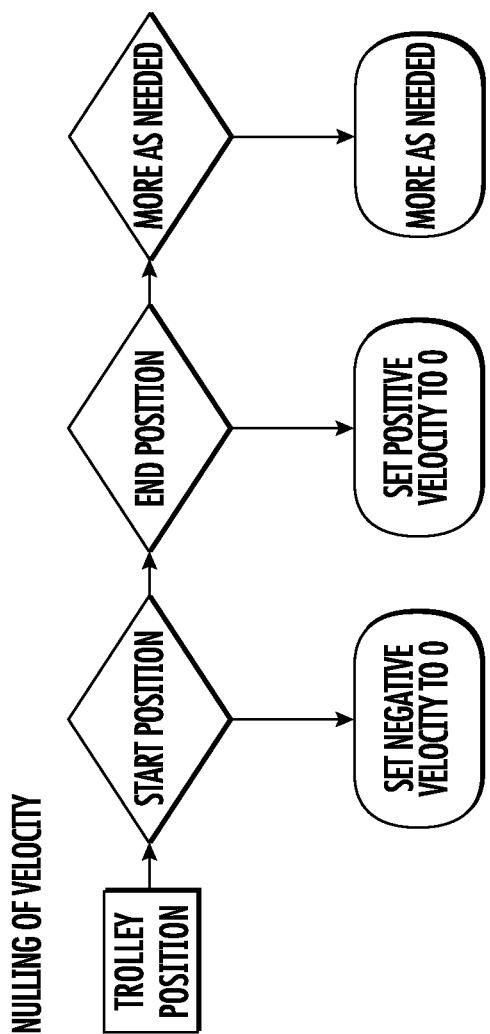

VEHICLE WASH SYSTEM FOR WASHING A VEHICLE WHILE THE CAR IS DRIVEN THROUGH THE VEHICLE WASHING SYSTEM

CROSS-REFERENCE TO RELATED APPLICATION(S)

This application claims priority to U.S. Provisional Ser. No. 63/025,798, filed on May 15, 2020, entitled "VEHICLE WASH SYSTEM FOR WASHING A VEHICLE WHILE THE CAR IS DRIVEN THROUGH THE VEHICLE WASHING SYSTEM," the disclosure of which is hereby incorporated herein by reference in its entirety.

BACKGROUND

Automatic car washes use brushes to apply a combination of cleaning solution and water to a vehicle and applies force to clean the surfaces of the vehicle. Generally, these brushes are cylindrical and are rotated about an axis and positioned to have the brushes contact the vehicle to "scrub" the portions of the vehicle coming into contact with the brushes. Even if multiple brushes are used, there is virtually always a space on the vehicle surfaces that does not get cleaned. Usually, these brushes start in the middle of the vehicle, separate and go down the sides of the vehicle, and then meet back up in the middle at the rear of the vehicle. This leaves the unsightly uncleaned space on the vehicle in the middle where most people look.

Additionally, vehicle washing systems almost always are systems where the vehicle is stationary for a period of time while the vehicle washing cycle occurs or are systems where the vehicle moves at a predetermined rate with the vehicle's tires in a track that pulls or pushes a vehicle through the vehicle wash system at a predetermined rate while the vehicle is in its neutral gear to allow movement.

SUMMARY

One aspect of the present disclosure is generally directed to an apparatus to automatically wash a vehicle in a car wash that typically includes: a trolley frame comprising a first support beam and a second support beam, the trolley frame defining a first reference frame; a first translation beam extending from the first support beam to the second support beam, where the first translation beam is at an angle with respect to the first reference frame; a second translation beam extending from the first support beam to the second support beam, where the second translation beam is at an angle with respect to the first reference frame; a first brush extending downward from a first trolley, the first trolley movably disposed on the first translation beam; and a second brush extending downwardly from a second trolley, the second trolley movably disposed on the second translation beam. The second trolley typically moves independently from the first trolley typically using different and independent drive systems or motors. The first brush is typically configured to contact a near front corner of the vehicle, traverse across a front side of the vehicle, stop on a far front corner of the vehicle, and remain stationary while contacting a far side of the vehicle and the second brush is typically configured to remain stationary while contacting a near side of the vehicle, traverse across a rear of the vehicle upon reaching a near rear corner of the vehicle, and stop upon reaching a far rear corner of the vehicle.

Another aspect of the present disclosure is generally directed to a method of automatically cleaning a vehicle. The method typically includes the steps of: rotating a first brush and a second brush; driving a vehicle through a vehicle washing assembly without the use of a vehicle moving track and while keeping the vehicle in a drive gear or moving the vehicle through a vehicle wash tunnel system by pushing or pulling the vehicle using a vehicle moving track system while the vehicle is in neutral; detecting when the first brush contacts a near front corner of a vehicle moving along a direction of travel based on feedback from a first brush motor that rotates the first brush; moving the first brush along a beam at an angle to the vehicle's direction of travel such that it remains in contact with a front face of a vehicle as is moves forward; detecting when the first brush reaches a far front corner of the vehicle and stopping the translation of the first brush on the beam based on feedback from a first brush motor that rotates the first brush; using feedback information from a second brush motor that drives the second brush to detect when the second brush contacts the near front corner of the vehicle; adjusting the position of the first brush and second brush as they translate down the sides of the vehicle to ensure a predetermined range of brush crush depth occurs between the first and second brushes and the vehicle sides; detecting when the second brush reaches a near rear corner of the vehicle using feedback from the second brush motor; and moving the second brush along a second beam at an angle to the vehicle's direction of travel such that it remains in contact with a rear face of the vehicle as it moves forward.

Yet another aspect of the present disclosure is generally directed toward a vehicle brush washing system to automatically wash a driven vehicle moving through the brush assembly that includes: a first trolley beam extending from the first support beam to the second support beam; a second trolley beam extending from the first support beam to the second support beam; a first brush extending downward from a first trolley, the first trolley movably disposed on the first translation beam; and a second brush extending downwardly from a second trolley, the second trolley movably disposed on the second translation beam. The first brush is typically configured to contact a near front corner of the vehicle, traverse across a front side of the vehicle, stop on a far front corner of the vehicle, and remain stationary while contacting a far side of the vehicle. The second brush is typically configured to remain stationary while contacting a near side of the vehicle, traverse across a rear of the vehicle upon reaching a near rear corner of the vehicle, and stop upon reaching a far rear corner of the vehicle. The first trolley is typically independently driven at changing or changeable speeds along the first translational beam based on feedback a controller receives from a first brush motor that provides rotational movement to the first brush and the second trolley is independently driven at changing or changeable speeds along the second translational beam based on feedback the controller receives from a second brush motor that provides rotational movement to the second brush.

These and other aspects, objects, and features of the present disclosure will be understood and appreciated by those skilled in the art upon studying the following specification, claims, and appended drawings.

BRIEF DESCRIPTION OF THE DRAWING

In the drawings:

FIG. 7 is a schematic view of brush positions with respect to vehicle position of an embodiment of the vehicle wash system.

FIG. 8 is another schematic view of brush positions with respect to another vehicle position of an embodiment of the vehicle wash system.

FIG. 30 is a flow chart detailing the nulling of velocity within the controller of an embodiment of the vehicle wash system.

DETAILED DESCRIPTION

Figure 1:
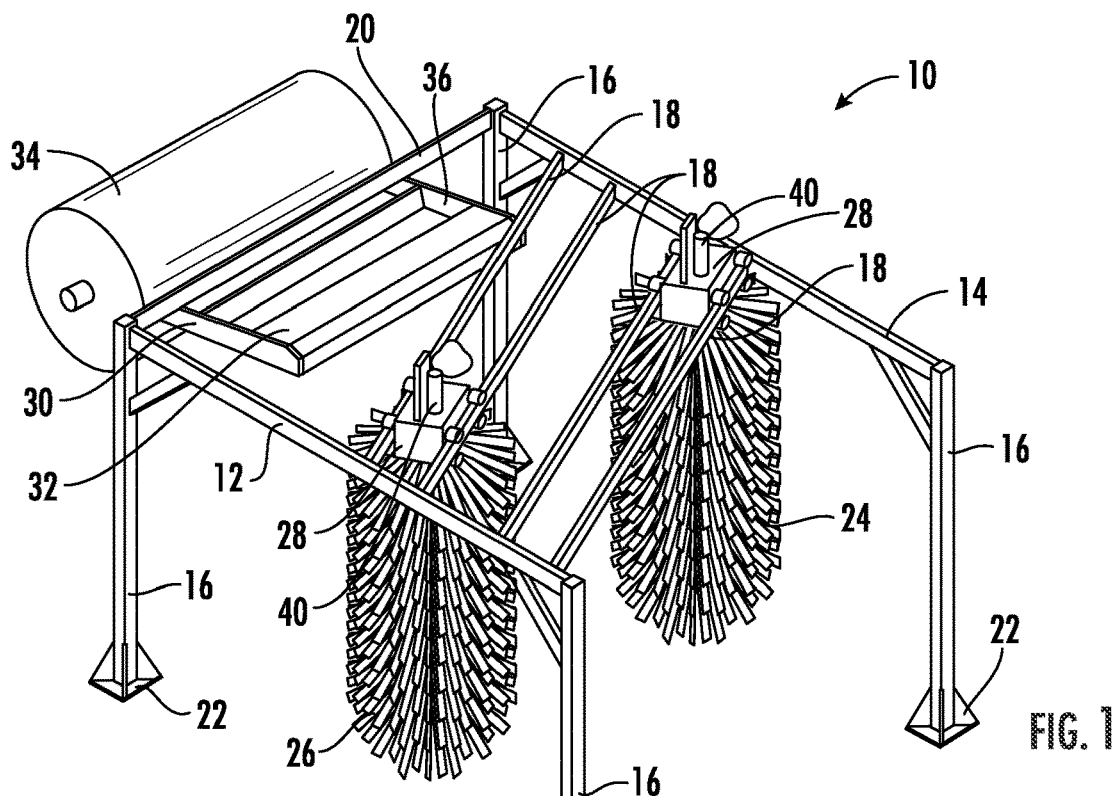
FIG. 1 is an isometric view of an embodiment of the vehicle wash system including a top brush assembly in an up position.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
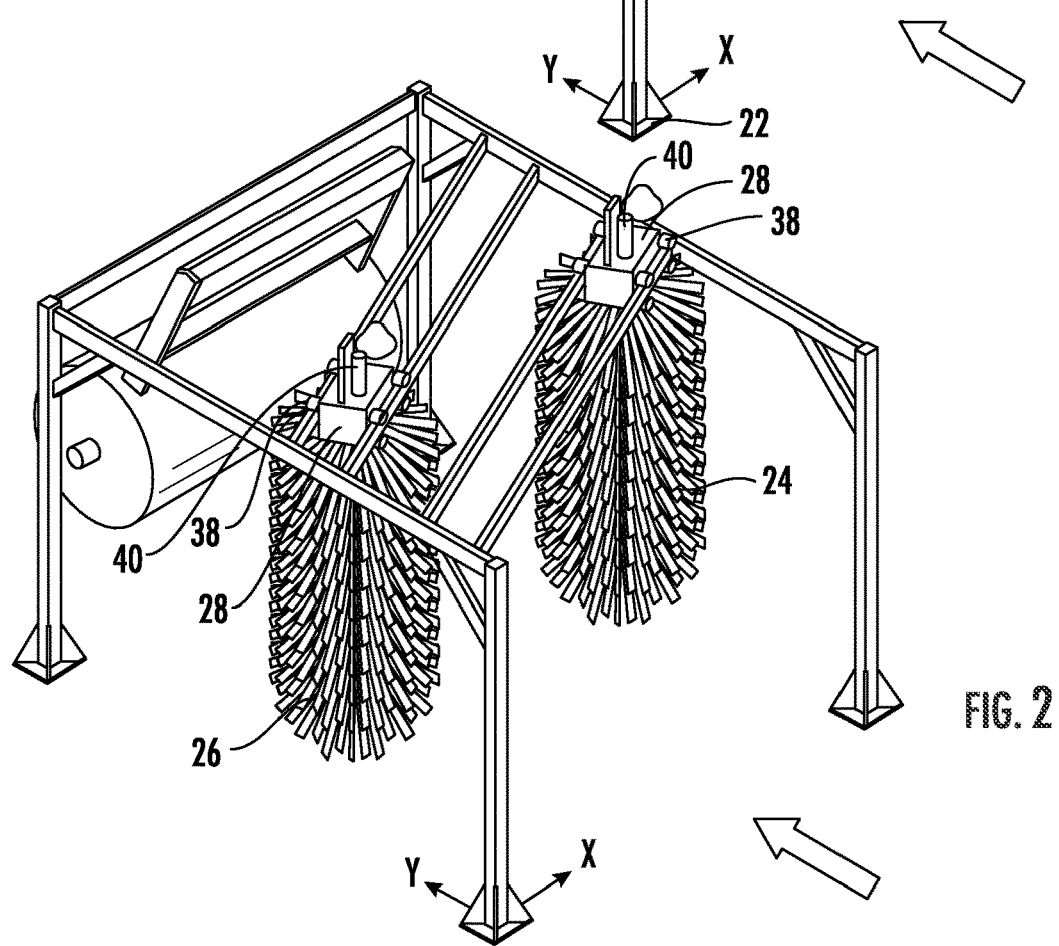
FIG. 2 is an isometric view of an embodiment of the vehicle wash system including a top brush assembly in a down position.
Figure 3:
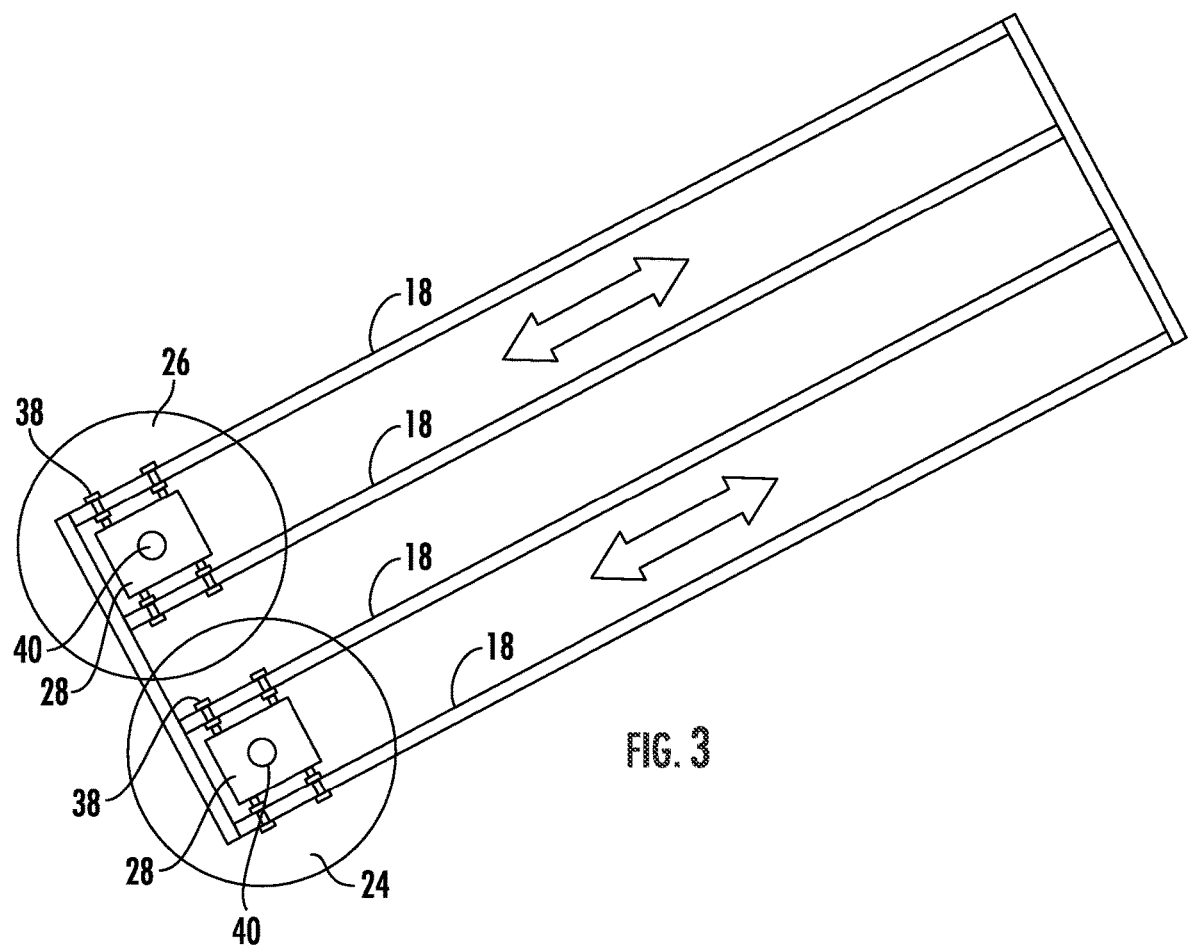
FIG. 3 is a schematic view of a trolley system of an embodiment of the vehicle wash system.

FIGS. 1 and 2 show a vehicle car wash brush assembly 10 to wash the front, sides, rear, and top of a vehicle. The vehicle car wash brush assembly 10 may include a first support beam 12 and a second support beam 14, which may be of various lengths, but are typically from about 10 feet to about 20 feet long.

Each brush (24, 26, 34) itself may be referred to as a single integral part throughout this specification, but may be a plurality of flexible fingers that are attached to a central hub. Alternatively, the brushes may include a number of individual chamois-type pieces of fabric attached around the central hub. For example, the brush may be a car wash side brush or top brush in operative engagement with an exterior of a surface of a vehicle as discussed herein. The side brushes are typically mounted on and a component of the vehicle car wash brush assembly 10.

The system includes a number of trolleys or carriages that include a hydraulic or electric motor that allow translation along a beam or provide rotational movement for the beams and the brushes. However, it is preferred in the case of the systems of the present disclosure that the motor is an electric motor because an electric motor provides the feedback for the various controls employed to dynamically adapt the systems to various conditions, discussed in detail below.

The motor rotates a brush shaft about a vertical axis in the case of the side brushes of the present disclosure. The axis may be slanted or tilted down. In certain embodiments, the axis is tilted based on a predetermined calculated force that the brush should impart on the vehicle as it is washed or dried. The axis may be tilted at a given angle based on the predetermined force such that as the vehicle moves through system, the brush is tilted outwardly (away from the vehicle) while still providing the cleaning or drying force that was predetermined.

Each brush 24, 26 may include a plurality of radially-pleated, synthetic, non-woven or woven, semi-porous fabric discs that are stacked on the support shaft to create the desired length/height of the brush. Other designs for the brushes may also be used. When in use, the fingers are wetted with some combination of water and a cleaning solution known in the art, and use centrifugal force when the brush is spun/rotated by the motor, which is typically one or more motors dedicated to the single brush, in order to contact the vehicle with a controlled brush crush amount. The brush crush is the amount of brush, while in operation, that contacts the vehicle, which in the case of the present disclosure is both monitored and regulated by the system dynamically. The contact of the brush to the vehicle allows the fingers to deliver the cleaning solution to the surface of the vehicle and wipe the surface clean, while not damaging the surface of the vehicle being washed, which can be clear coated, painted, sheet metal and/or plastic.

Angled translation beams 18 may be attached from the first support beam 12 to the second support beam 14. The support beams 12, 14 are shown attached and positioned through standing posts 16, but it should be appreciated that the translation beams may be moveable along the first support beam and/or the second support beam such that the angle of travel of the brushes can dynamically change based on the feedback from the systems based on various factors including the size of the vehicle being washed and, in particular, the speed by which the vehicle is traveling, typically being driven by a human, through the vehicle wash system (see FIGS. 22A-22H and description below). The vehicles are typically driven through the vehicle wash systems and the vehicle wash systems do not use a track system with the vehicle in neutral to traverse the vehicle through the vehicle wash systems of the present disclosure, which allows for more rapid vehicle washing while maintaining the quality of the vehicle washing process.

The standing posts 16 may be securely attached to the floor of a carwash building using one or a plurality of feet 22, which may or may not be positively attached to the floor using stakes or other attachments of the feet to the floor. However, a person of ordinary skill would recognize that the standing posts may be replaced by hanging posts that are attached to the ceiling of a carwash building, or may include non-secure attachments at the bottom such as caster wheels or the like to allow for movement of the assembly as necessary.

The vehicle wash brush assembly 10 may further include a front support beam 20. The front beam 20 may be optionally included to support a top vehicle brush assembly 30. The top vehicle brush assembly 30 may include one top brush 34 or a plurality of top brushes and a corresponding counter-weight(s) 32, attached through a top brush frame 36. The top brush assembly 30 may be attached to the front beam about a rotation axis that is between the top brush 34 and the counter-weight 32. The exact location of the rotation axis will depend on the weight of the top brush 34 and the counter-weight 32 and may be optimized to allow for a smaller motor to urge the top brush 34 up and down as necessary depending on the vehicle that is being washed. FIG. 1 shows the top brush 34 in its up position, and FIG. 2 shows the top brush 34 in its down position.

The vehicle brush assembly 10 may also include a first brush 24 and a second brush 26. The first and second brushes 24, 26 are designed to rotate and contact a vehicle as it traverses through the car wash assembly 10. The brushes 24, 26 are each attached to their own independently controlled trolley systems 28 that each ride along a pair, typically their own dedicated pair, of translation beams 18 and move based on the feedback from their own motor system and, in some instances one or more additional sensors providing feedback regarding the movement and/or use of either or both of the trolley system and the brush(es) engaged with the individual trolley system. As shown in FIGS. 1 and 2, the trolleys 28 have a pair of wheels 38 on both sides of the trolley 28 that ride on the beams 18. At least one of the wheels 38 on each of the trolleys 28 is a drive wheel that motivates the trolleys 28 and causes the trolleys 28 to traverse along their own and corresponding traversing beams 18 as needed to wash the vehicle effectively as the vehicle is driven by a driver through a vehicle wash bay where the vehicle wash brush assembly is located.

As discussed above, each of the trolleys 28 includes a motor 42 (see FIGS. 4-5) that is connected to a controller. The controller or the controllers used in connection with the systems of the present disclosure may be a PID controller, a microprocessor or microcontroller, which generally have one or more central processing units along with memory and programmable input/output peripherals. The program memory can be in the form of ferroelectric random access memory, NOR flash or one time programmable (OTP) random access memory. The controller may be onboard the trolley 28, or each trolley may be connected to a central controller or individual remotely located controllers (not shown) located outside of the apparatus 10. When remotely located, the controllers are typically not in the same building as the vehicle wash brush assembly of the present disclosure, but could be remote in that it is not located in the same room as the vehicle wash brush assembly, but perhaps in a common control room within the same building. The connection between the controller(s) and the trolley systems may be a wired or wireless connection, but would typically be a wireless connection. Each of the brushes 24, 26 are connected to and hang from a bottom side of their corresponding trolley 28 such that they are able to rotate about an axle 40 that is operably and controllably connected to a motor within or otherwise attached to the trolley 28. This allows the brush to spin at high speed and clean the vehicle as it traverses through the vehicle wash brush assembly 10.

The axle 40 may also be able to swing fore and aft (along the y-axis in the first reference frame) and side to side (x-axis in the first reference frame). This allows the brush to swing away from the vehicle along either or both axes if the contact with the vehicle is too direct or forceful. The connection between the brush axle and the trolley may be a universal joint, or some other joint known in the art that allows for the brush to swing freely and deliver rotational energy at the same time. Although not typically done, it is within the scope of the present disclosure that the movement of the joint may be controlled and motivated via a motor system itself into various different positions and optionally held at different angles other than perpendicular as well.

Figure 4:
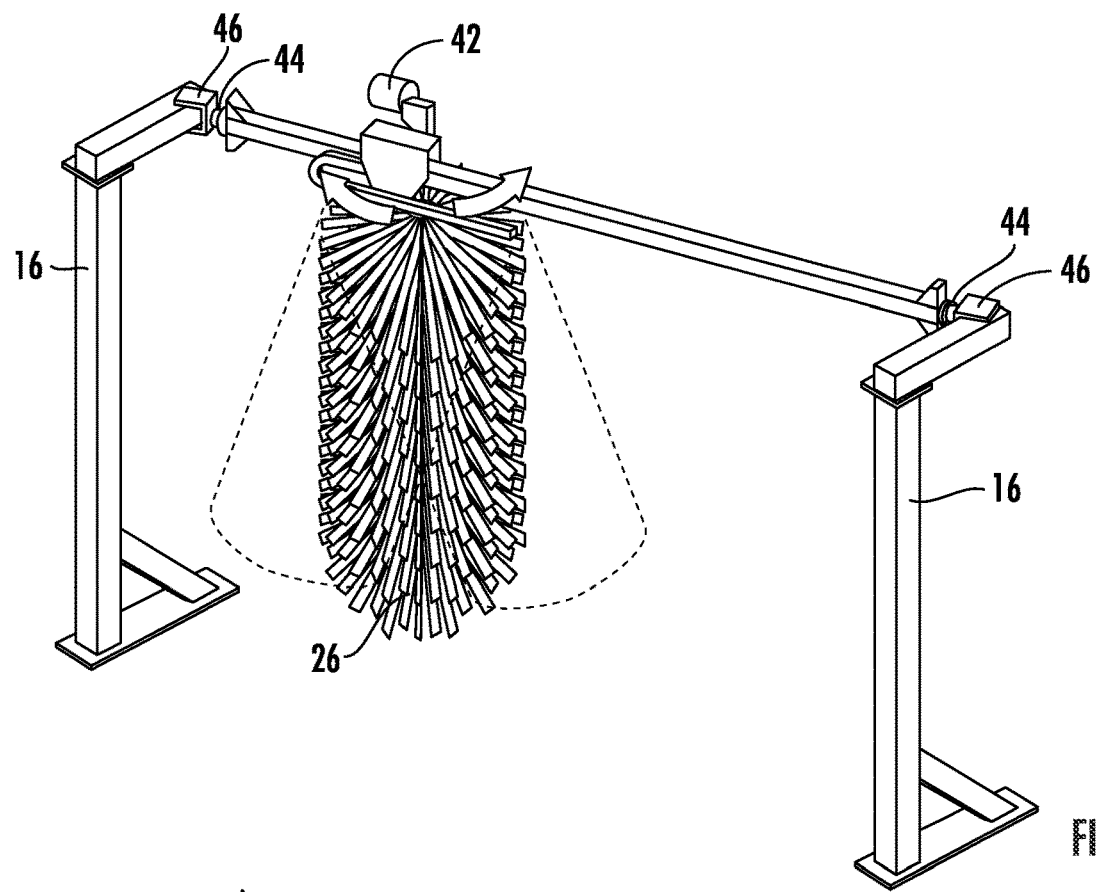
FIG. 4 is an isometric view of an embodiment of a single trolley beam showing one axis or rotation of the brush.
Figure 5:
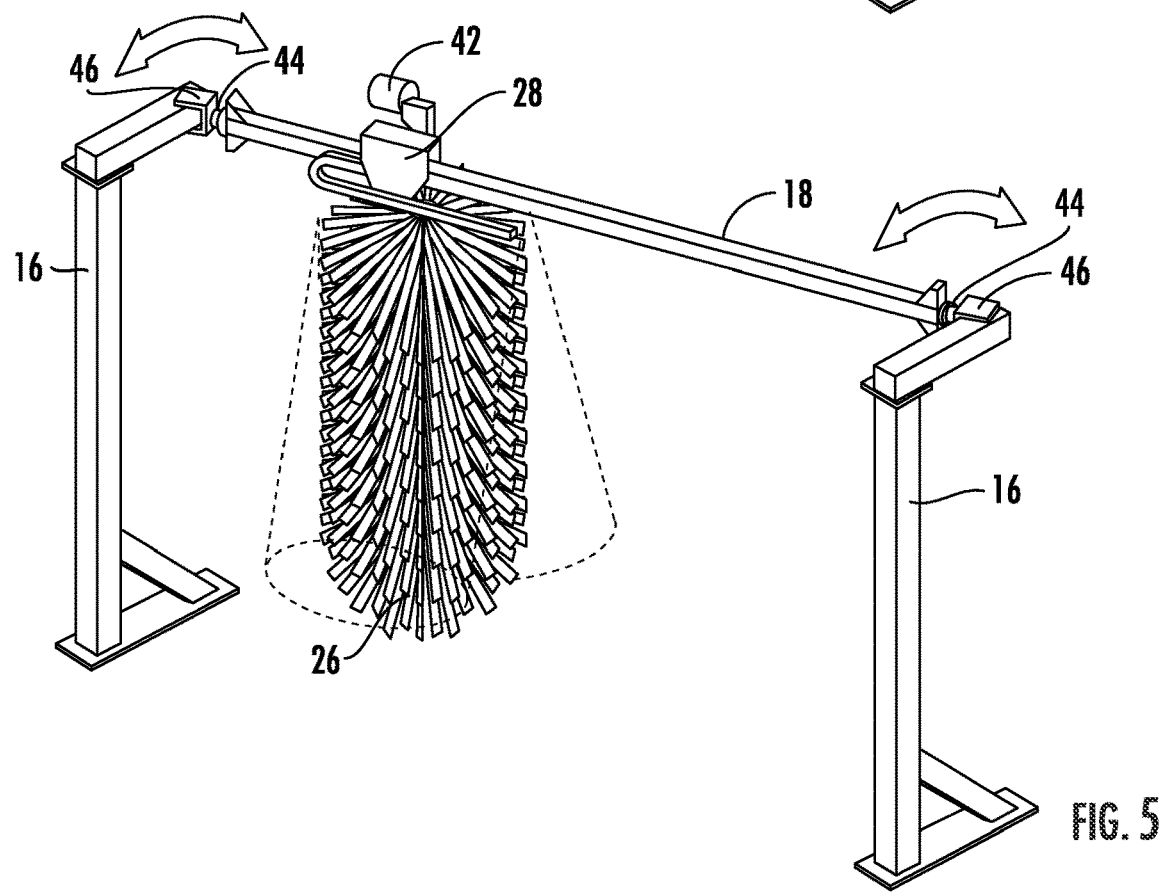
FIG. 5 is an isometric view of an embodiment of a single trolley beam showing another axis of rotation of the brush.

FIGS. 4 and 5 show an alternative embodiment of the translation beam 18, the brush 26, and trolley 28. In this embodiment, there is a single translation beam 18 for each trolley 28. At least one wheel, but typically only one wheel 38 according to this embodiment of the present disclosure, may be disposed within or otherwise engaged with the trolley 28 such that the wheels move the trolley along the single translation beam and urge the trolley 28 and brush 26 along the single translation beam 18. This may simplify the trolley/brush connection because the fore/aft rotation may be taken up by the single translation beam 18 connection to the standing posts 16, which may be accomplished by a bearing/cup arrangement or similar construction allowing rotation of the single translation beam 18 about its longitudinal axis. The single translation beam 18 and standing post 16 connection may include a bearing/cup arrangement, with the bearing 46 disposed on the post 16 and the cup 44 on the beam 18. A person of ordinary skill will readily recognize that this may be accomplished by reversing the order of the bearing and cup, or by a number of other rotational arrangements.

Figure 19:
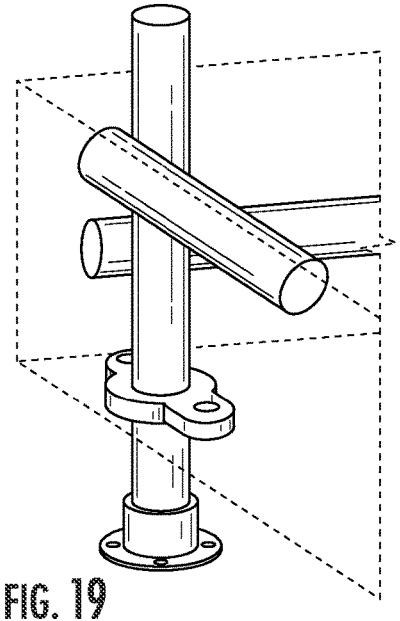
FIG. 19 is an enlarged perspective view of a 4-post design of the vertical shaft of the brush assembly that provides a full range of motion to the brush and permits the brush to swing inwardly.

In still another embodiment, FIG. 19 shows how the brush could have a full range of motion to swing within an assembly. The vertical shaft is the axle 40 of the brush assembly. The remaining two shafts may be used to allow the brush assembly to pivot in the x-direction and the y-direction. This is both for good contact between the brush and car as well as a safety feature to allow the brush to move if contacted too hard or from the wrong direction.

Figure 6:
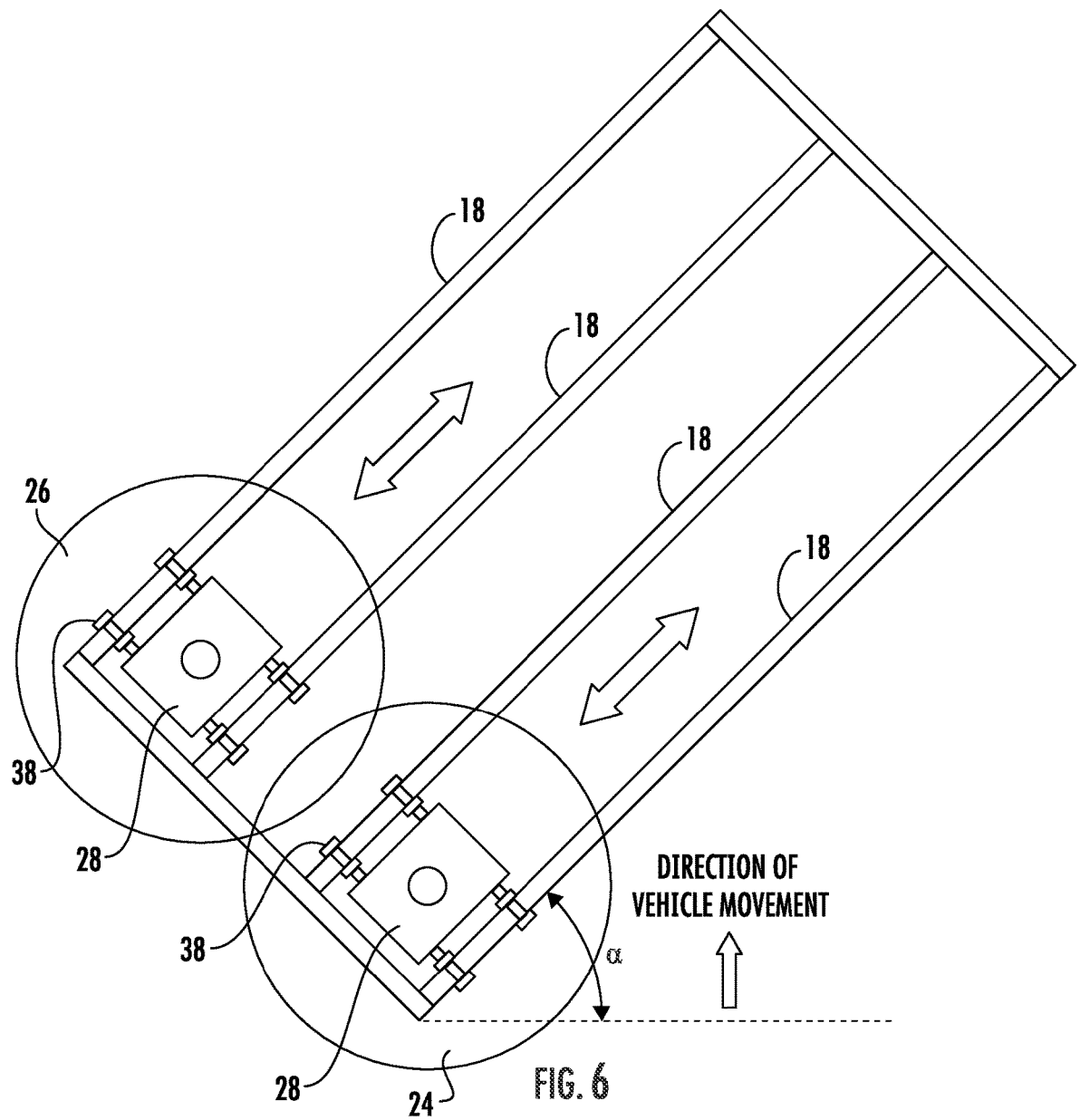
FIG. 6 is another schematic view of a trolley system of an embodiment of the vehicle wash system.
Figure 18:
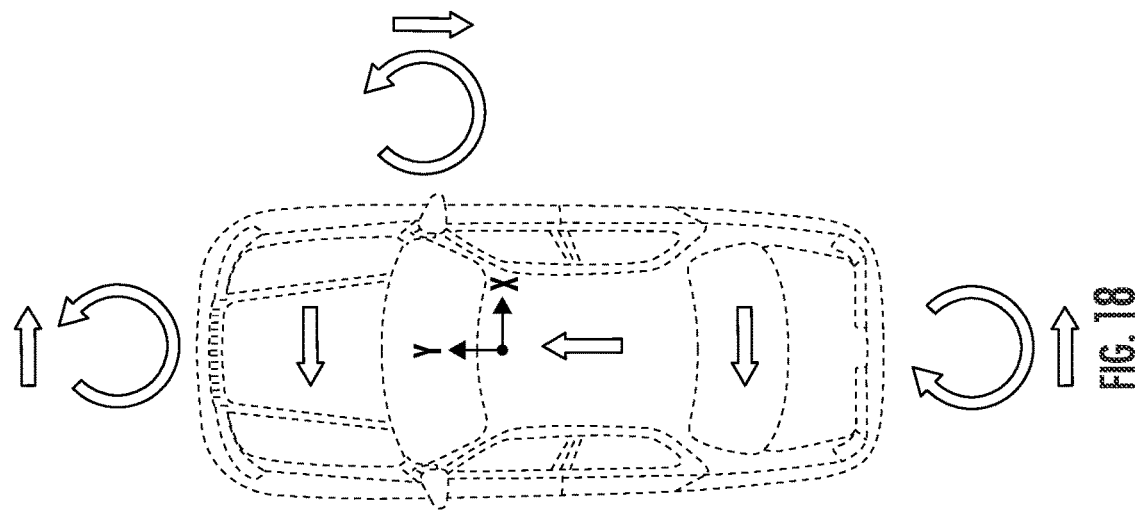
FIG. 18 is a schematic view of the brush movements with respect to a vehicle as it moves through an overall vehicle cleaning apparatus.
Figure 17:
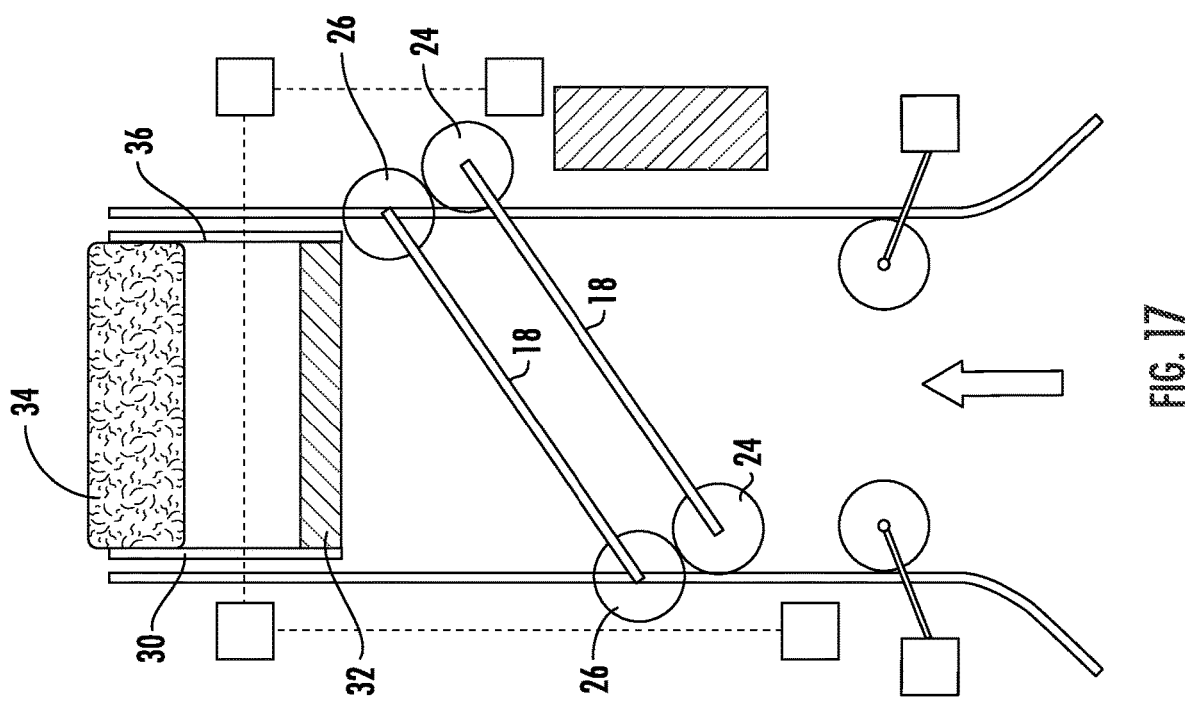
FIG. 17 is a schematic view of an overall vehicle cleaning apparatus including an embodiment of the vehicle wash system.

As discussed herein, while the systems of the present disclosure may be used in any vehicle washing system including in a tunnel systems that uses a track to push or pull a vehicle through the wash system, the systems of the present disclosure also allow vehicles to be washed when driven through the vehicle wash brush assembly within a vehicle wash bay by a driver at slow speed but varied rates or preferably constant rates by the driver himself/herself without the use of a motorized track and the vehicle in neutral. The trolleys 28 follow along the translation beams 18. The translation beams 18 are set at an angle α (see FIG. 6) to the x-direction in the first reference frame, which may be normal to the direction of movement of the vehicle through the assembly 10. As the vehicle moves forward with respect to the apparatus 10, the brushes 24, 26 typically move along the beams and along this angle, which is substantially orthogonally with respect to a second or vehicle reference frame (see FIG. 7). Orthogonally in this respect means that the brushes 24, 26 follow along the contours of the car and reference will be made to the front, sides, and rear of the vehicles as if they are orthogonal to the vehicle reference frame as shown in FIG. 18; however, a person of ordinary skill will recognize that different vehicles have different contours along each of the front, sides, and rear. Independently driven brushes on independent trolleys are connected to their own travel path frame made up of one or more translation beams. The systems of the present disclosure do not typically utilize counterweights to move the trolley systems into a start position after they have traveled and are instead independently driven based on feedback received by a controller from sensors of the trolley or brush or the motor associated with the individual brush.

The ability of each brush to be independently controlled allows the system to be flexible to adapt to any speed that a vehicle travels through the vehicle wash brush assembly that heretofore was not possible in prior designs that do not incorporate sensor feedback to measure feedback such as the extent of brush crush on the vehicle based on motor resistance and possibly other measurements. Systems of the present disclosure are particularly significant in that they do not require channels with movement systems that pull or push the vehicle through the wash system at a constant rate making the systems of the present disclosure less likely to break down and be somewhat portable should the location for the vehicle brush assembly need to be moved. Accordingly, systems of the present disclosure are very well suited for car dealership use, fleet vehicle use, and rental vehicle use as well as use in a local vehicle washing location. The system is less tied to the physical location than previous systems that require a vehicle moving track.

The angle of the beams 18 and the independently moveable trolleys carrying the brushes allow the brushes 24, 26 to move forward with the forward movement of the vehicle, while at the same time moving across a side, one trolley on each side, and the front or rear of the vehicle. In order to clean the sides of the vehicle, the translation of the trolleys 28 and each brush 24, 26 may be stopped while the vehicle continues to move forward through the wash system 10, simply allowing the rotation of the brushes to clean the sides.

As is described in detail below and shown in at least FIGS. 7-16, the front and passenger side of the vehicle cleaning may be accomplished by one brush assembly in the embodiment shown, first brush 24. As a vehicle begins entering into engagement within the systems. The first brush 24 starts crossing the path of the vehicle by leading diagonally, allowing the brush to make continuous contact with the entire front of the vehicle as they both move forward. Once the first brush 24 clears the vehicle front it stops moving along or at least stops moving substantially along the track. As the vehicle continues forward the first brush 24 makes contact along the passenger side. The trolley carrying the first brush typically would only move back or further to keep in contact with the appropriate brush crush on the side of the vehicle.

The driver and rear cleaning may also be accomplished by one brush, the second brush 26. FIGS. 7-16 show the trolleys and brushes at various stages as a vehicle passes through the vehicle brush assembly. The second brush 26 is stationary to start (FIG. 8) as the vehicle moves forward and makes contact with the driver side (based upon a vehicle designed for driving in the United States). The second brush 26 then starts crossing the path of the vehicle by following diagonally down the track. This path of travel allows the brush to make continuous contact with the entire rear of the vehicle as they both move forward.

Initially, as shown in FIG. 7, the trolleys 28 and the brushes 24, 26 are in their home position, which as shown in FIGS. 7-16 is their far right hand position. A person of ordinary skill will readily recognize that the home position may be on the left without deviating from the spirit of the disclosure. As the vehicle pulls forward, the first brush 24 comes into contact with the left front corner of the vehicle. The controller registers an increase in the power required to keep the brush spinning and begins movement of the first brush 24 along the translation beam 18, as shown in FIG. 8. The controller uses the power signal to control the trolley to move along the beam 18 such that about 6" of the brush overlaps the front of the vehicle. If the required power goes too high, the trolley is sped up to get farther in front of the vehicle and lower the overlap. If the required power goes too low, the trolley is slowed down in order to increase the overlap between the brush and the vehicle.

Figure 9:
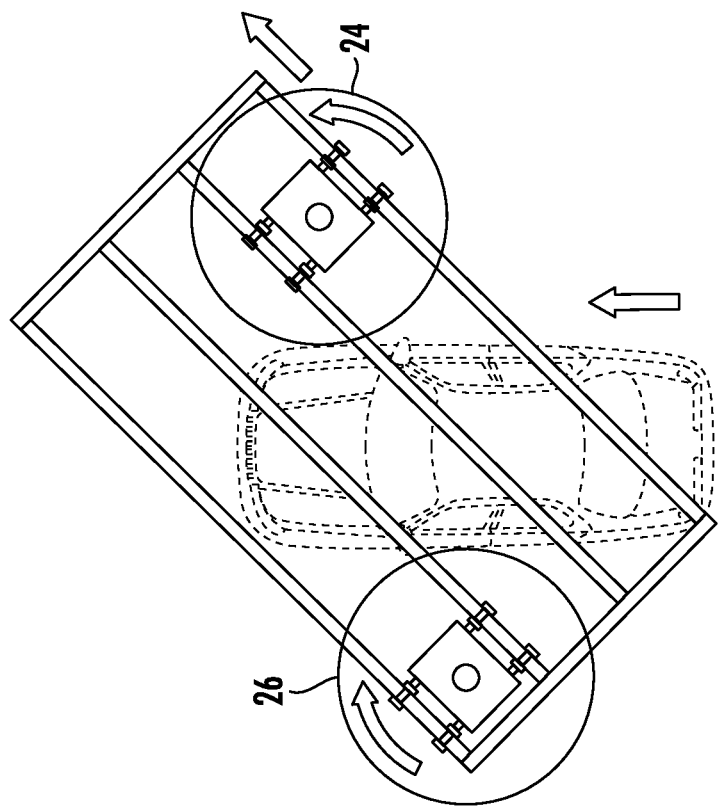
FIG. 9 is another schematic view of brush positions with respect to another vehicle position of an embodiment of the vehicle wash system.

As the first brush moves along the beam 18, cleaning the front of the vehicle, the second brush 26 comes into contact with the left front corner of the vehicle as shown in FIG. 9, ideally about 6" of overlap on the side of the vehicle. If the PID controller associated with the second brush 26 detects too much or not enough power needed to rotate the brush 26, it may move the trolley 28 forward or back to increase or decrease the overlap. Other than these small deviations, the second brush 26 remains stationary with respect to the first reference frame (the assembly 10), while translating down the side of the vehicle with respect to the second reference frame (the vehicle, FIG. 18).

Figure 10:
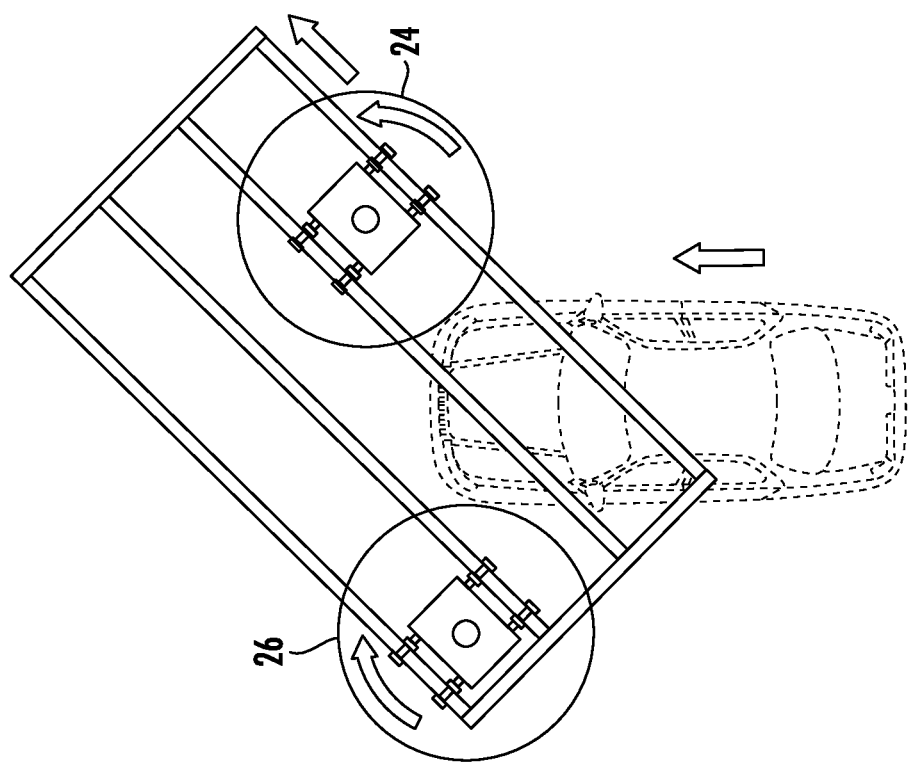
FIG. 10 is another schematic view of brush positions with respect to another vehicle position of an embodiment of the vehicle wash system.
Figure 11:
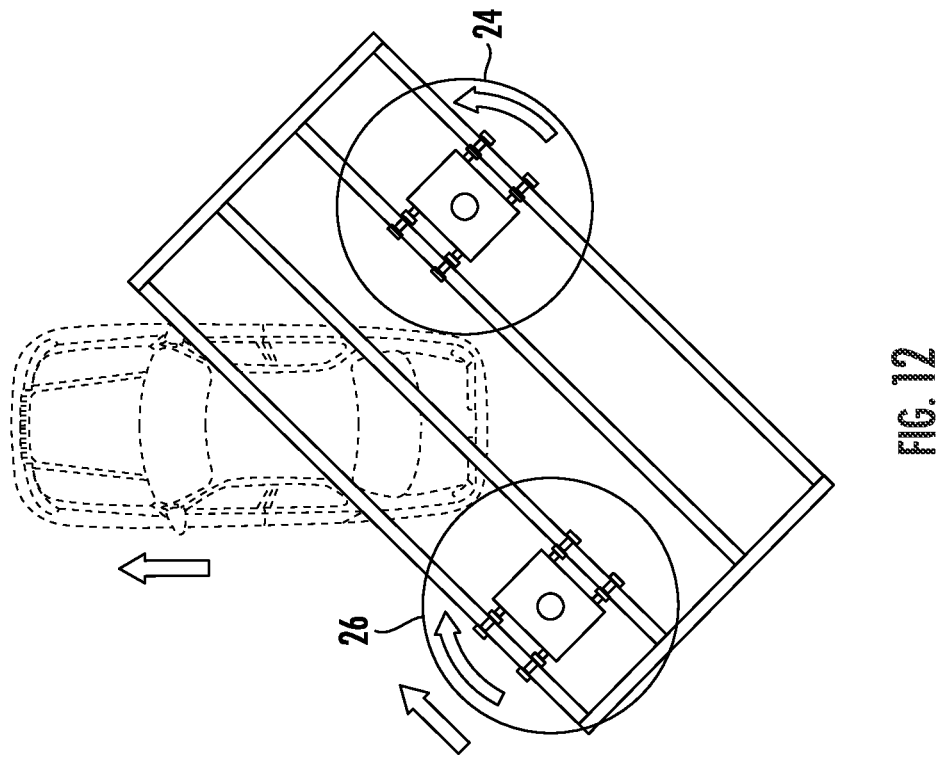
FIG. 11 is another schematic view of brush positions with respect to another vehicle position of an embodiment of the vehicle wash system.

As shown in FIG. 10, once the controller associated with first brush 24 detects that the first brush has reached the right front corner of the vehicle, it will instruct trolley 28 to stop moving along the beam 18. The controller will move the trolley such that from about 5 inches to about 7 inches, more typically about 6 inches of the first brush 24 is overlapping the right side of the vehicle. This is typically referred to as the brush crush depth. At this point, the brush 24 will remain substantially stationary with respect to the assembly 10 and its first reference frame, while at the same time moving down the side of the vehicle with respect to the vehicle or second reference frame as the vehicle moves forward through the assembly 10, as shown in FIG. 11. However, the system also may utilize the data received from the sensors and/or motor of the trolley to move the trolley slightly to keep the brush crush within a predefined amount while the brush travels along the length of the vehicle's side.

Figure 12:
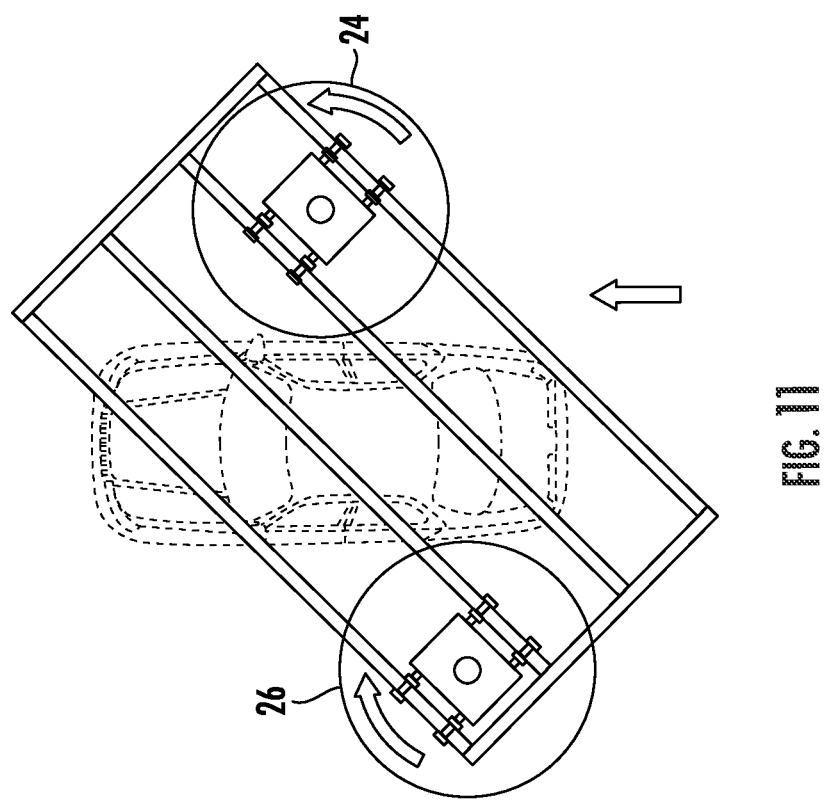
FIG. 12 is another schematic view of brush positions with respect to another vehicle position of an embodiment of the vehicle wash system.
Figure 14:
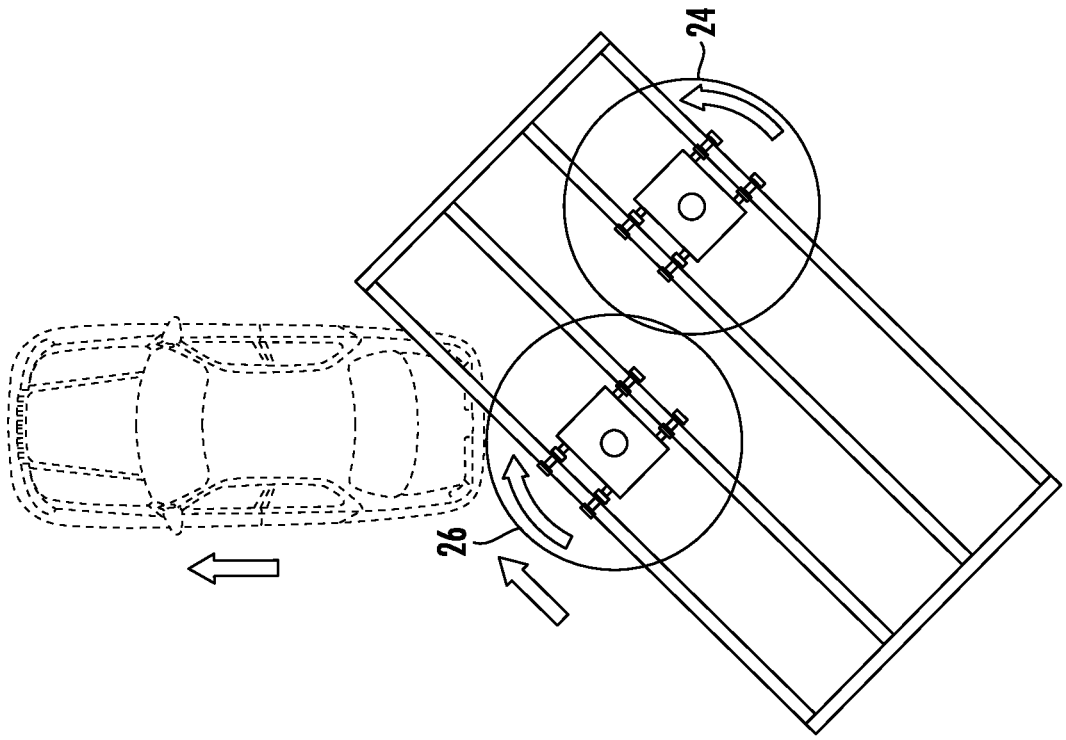
FIG. 14 is another schematic view of brush positions with respect to another vehicle position of an embodiment of the vehicle wash system.
Figure 13:
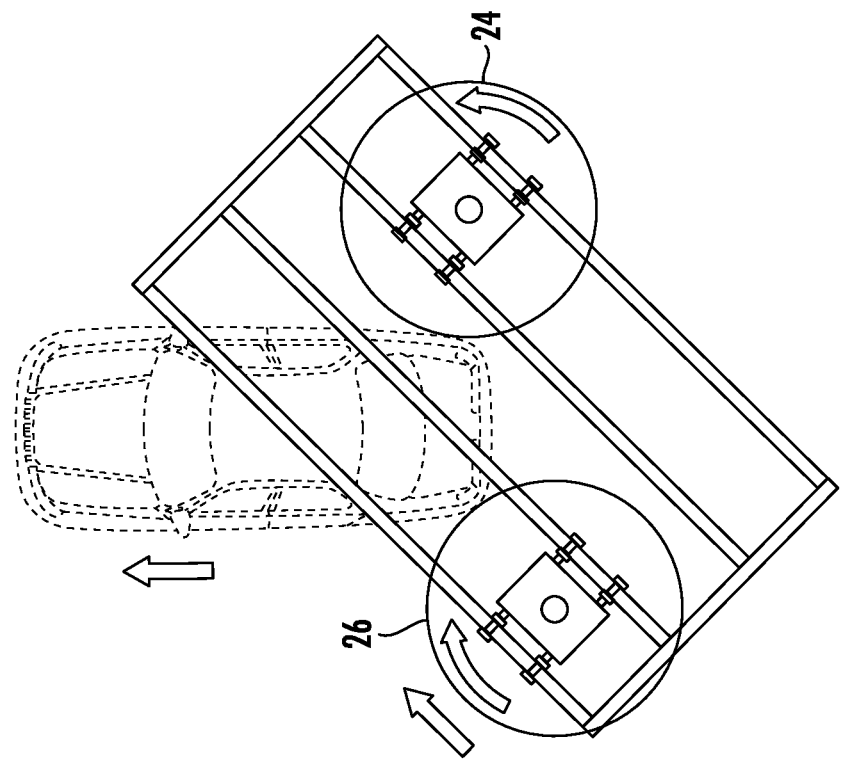
FIG. 13 is another schematic view of brush positions with respect to another vehicle position of an embodiment of the vehicle wash system.
Figure 15:
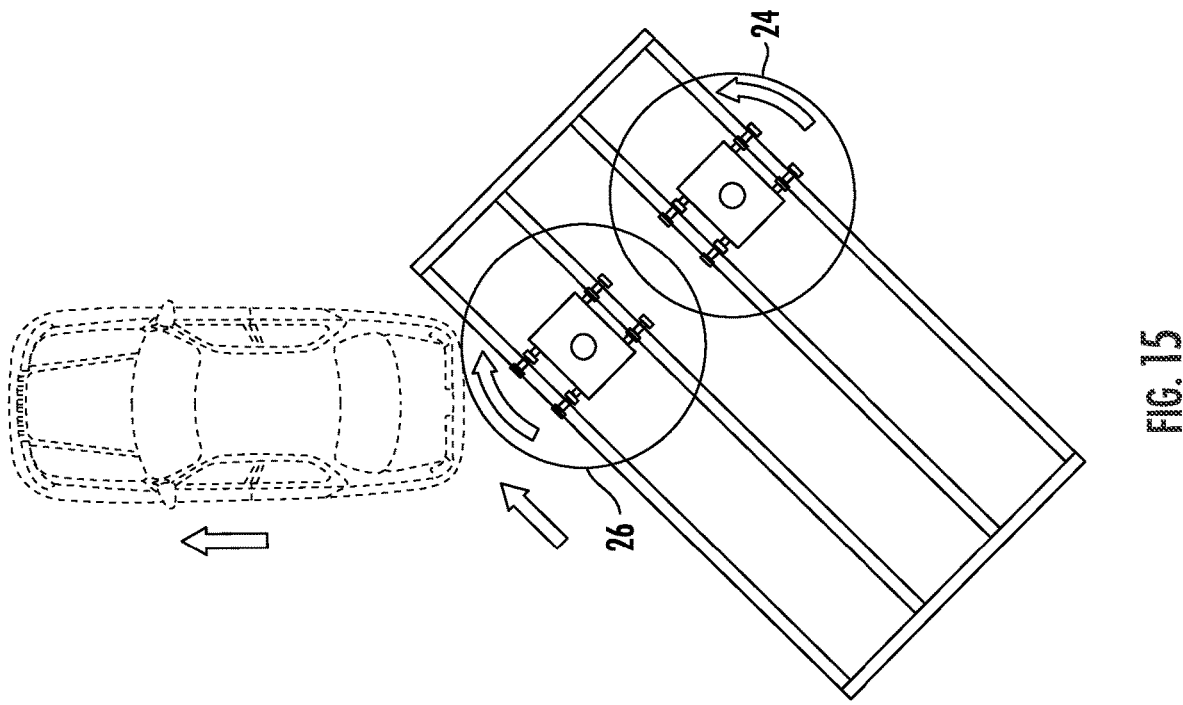
FIG. 15 is another schematic view of brush positions with respect to another vehicle position of an embodiment of the vehicle wash system.

When the controller associated with the second brush 26 detects that the brush 26 has reached the rear corner of the vehicle as shown in FIGS. 12-13, it instructs trolley 28 to begin translating along the beam 18. The brush 26 then follows the rear contour of the vehicle. The brush moves along the angle α with respect to the first reference frame, while at the same time moving across and cleaning the rear face of the vehicle orthogonally with respect to the second or vehicle reference frame, until it reaches the far rear corner as shown in FIG. 15. Ideally, the overlap at the near front corner and the far rear corner of the first and second brush is at least 6" in order to ensure full cleaning around the entire perimeter of the vehicle.

Figure 16:
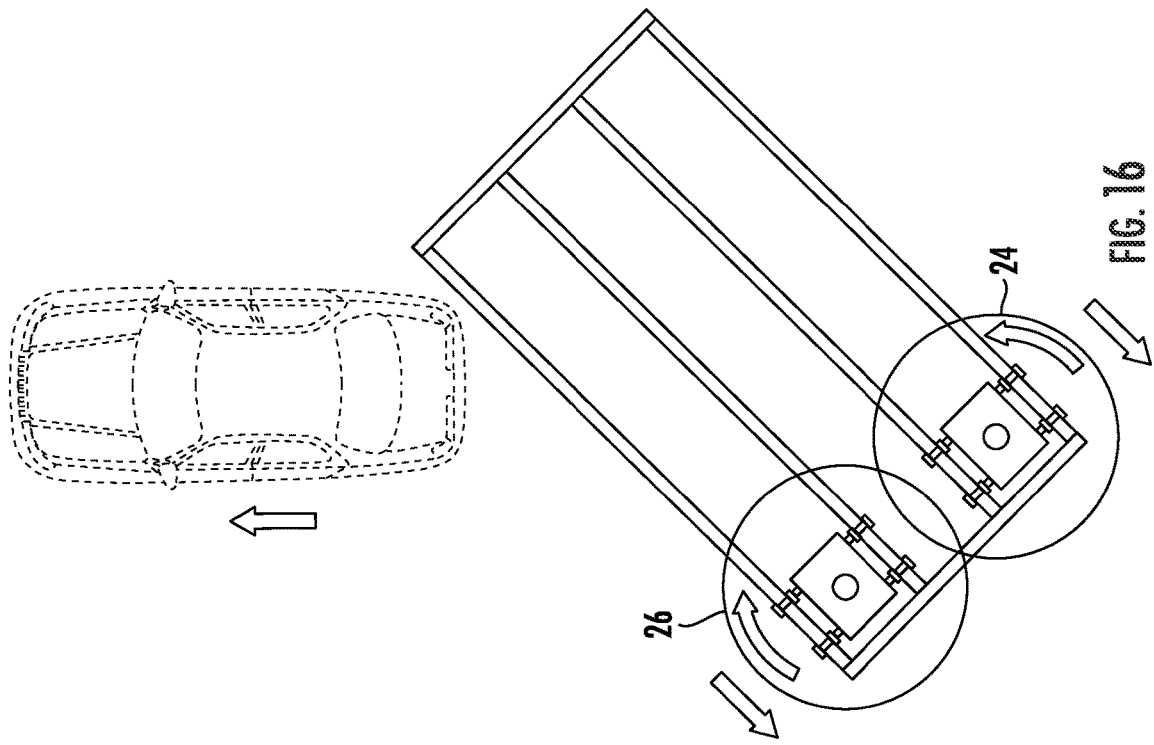
FIG. 16 is another schematic view of brushes going back to home positions of an embodiment of the vehicle wash system.

Once the first and second brush complete their cleaning, which the system can sense, the controller instructs the trolleys 28 to return both the first 24 and second brush 26 to their home position as shown in FIG. 16 to prepare for the next vehicle to clean. Each trolley typically returns to the initial position using kinetic energy provided solely by the motor of each individual trolley and not gravity or counterbalance weights or other ways. While the Figures show the brushes 24, 26 moving such that the brushes at the point of contact with the vehicle move in the direction of the brush with respect to the vehicle, it should be known that rotating the brushes in the opposite direction also presents benefits to the cleaning of the vehicle, such as better coverage of the back side of mirrors. Rotational direction of the brushes could conceivably be changed while in the vehicle is traveling through the systems of the present disclosure. Also, conceivably two sets of trolleys and their corresponding translation beams could be utilized such that the brushes on one set of trolleys rotate in the counterclockwise direction and the other set of trolleys and their corresponding brushes rotate in a clockwise direction. In this case, the translational beams of each set of trolleys are typically opposing one another such that the first set may extend from the first support beam proximate where the vehicle enters the assembly to the opposing support beam and the second set of trolleys extend from a location proximate where the first set of trolleys end their cycle and end their travel at a point on the first support beam farthest from the entry point of the vehicle into the wash. Of course, the two sets of trolley systems may be substantially parallel with one another as well, but with the brushes rotating in the opposite rotational directions from one another.

Figure 20:
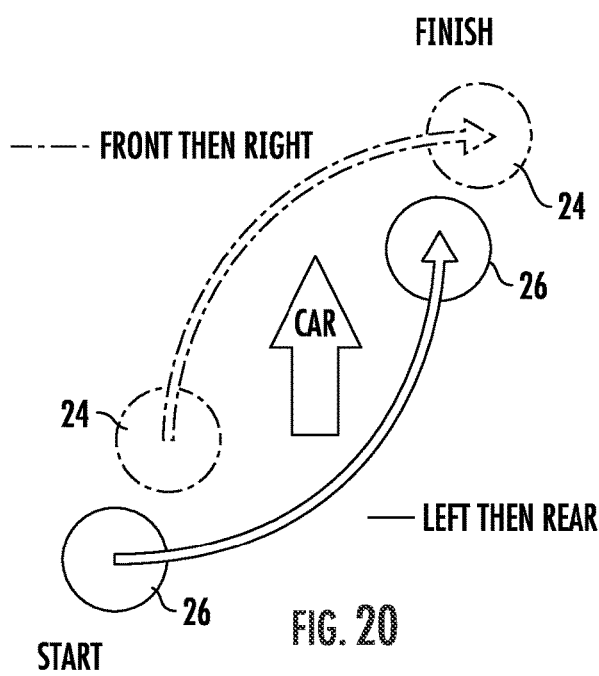
FIG. 20 is a schematic of another embodiment of the vehicle wash system including trolley bars with curvature.

In another embodiment as shown in FIG. 20, the beams 18 may be curved or arcuate to allow for differing speeds in the x and y-directions with respect to the first reference frame. This design may allow for more forward velocity for the first brush 24 at the beginning of travel and the second brush 26 at the end of travel when the contours of most vehicles require a slightly increased speed to keep up with the contours of the front and rear faces of the vehicles.

Figure 21:
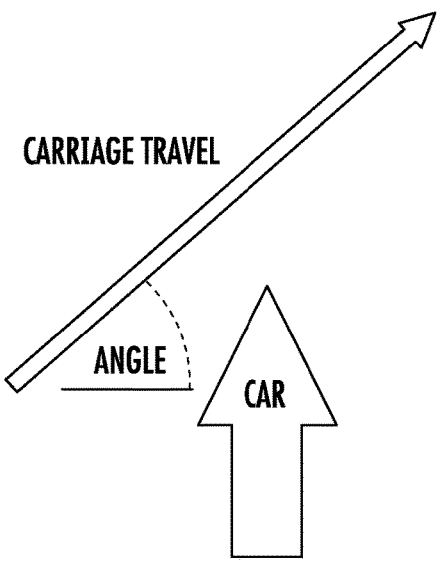
FIG. 21 is a schematic showing the components to calculate the angle of the trolley beams of an embodiment of the vehicle wash system.

The angle "α" is a function of the speed of the vehicle as it moves through the assembly 10 and the speed of the trolleys 28 along the traversing beams 18. As shown in FIG. 21, the equation is given by:

(Carriage Speed)=(Vehicle speed)/Sin(α)

Using the above equation, if either or both of the speed of the trolleys and/or the vehicle are set for a given carwash, then the angle of the traversing beams may be set to best clean the vehicles, with slight changes by the controller to the trolley motors to tailor the cleaning for each vehicle.

In another embodiment shown in FIGS. 22A-22H, the beams 18 may be rotatably mounted on posts 120. In this embodiment, there may be two beams 18, each with one brush 24, 26. One end of the beam 18 may be rotatably attached to the post 120, and the second end may be slidably attached to a carriage 122 on a transverse beam 118 (transverse in this case means the beam that is oriented substantially transverse to the beam 18). The carriage 122 may be slidably attached to the transverse beam 118 through rollers or the like. The carriage 122 may include a rotatable portion that the beam 18 is coupled to and may be above or below the transverse beam 118.

The beam 18 may slide within the rotatable portion of the carriage 122, or may be fixed to the rotatable portion. In the embodiment where the beam 18 is fixed within the rotatable portion of the carriage 122, the beam 18 may be a telescoping beam to take up the difference in length between the post 120 and the transverse beam 118 at different points along the transverse beam 118. In still another embodiment, the transverse beam 118 may be curved to match the radius from the post 120 to the transverse beam 118 in all positions. In this embodiment, the beam 18 may be fixed to the carriage 122 without needing to be telescoping.

The carriage 122 and the post 120 may both or only one may include a motor electrically coupled to the PID controller. The controller may send a signal to the post 120 to rotate the beam 118 as necessary and the carriage 122 simply rides along the transverse beam 118. Alternatively, the carriage 122 may include a motor in electrical communication with the controller to move the carriage 122 along the transverse beam 118, and the beam 18 simply rotates on the post 120. In still another embodiment, both the post 120 and the carriage 122 include motors that work concurrently to actuate the beam 18 to the desired orientation. The trolley 28 includes a motor to allow the brushes 24, 26 to move along the beams 18.

Figure 22A:
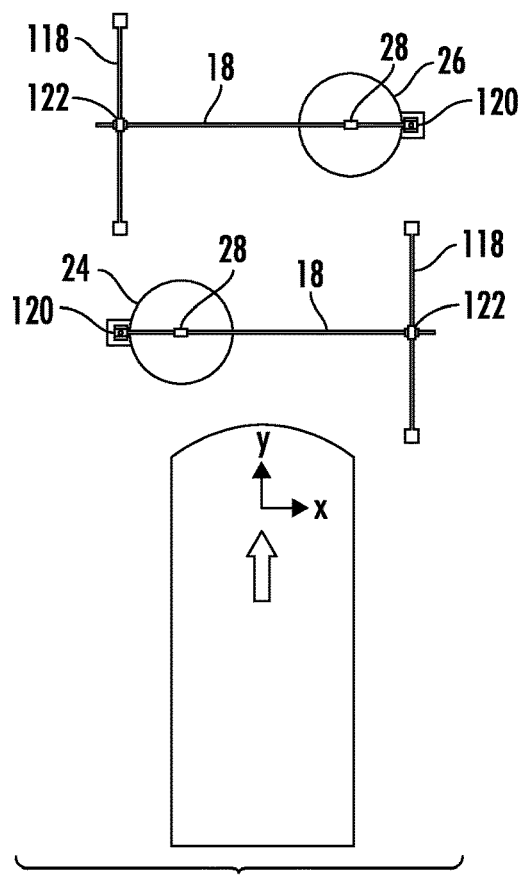
FIGS. 22A-H are schematic views of brush and beam positions as a vehicle moves through another embodiment of the vehicle wash system.
Figure 22B:
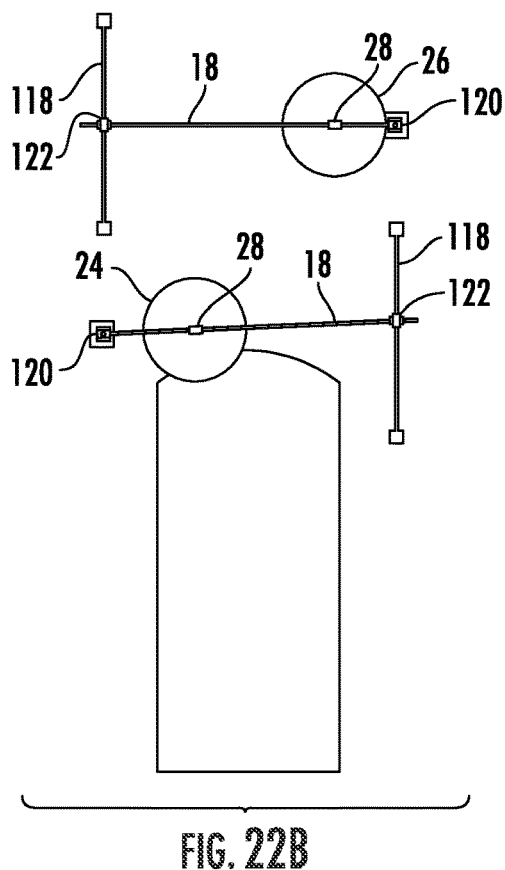
Figure 22C:
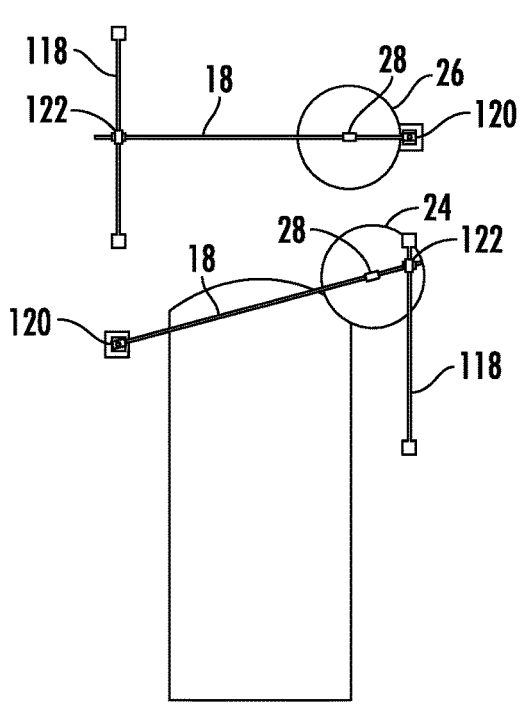

In use, FIG. 22A shows the initial or home orientation or positions of the washing system as the vehicle moves in the y-direction, with the first brush 24 set to contact the left front of the vehicle first. As the vehicle approaches the first brush 24 as shown in FIG. 22B, the first beam 18 begins rotating to allow the first brush 24 to contact the entire front of the vehicle no matter the curvature of the vehicle. Once the first brush reaches the right side of the vehicle, the trolley 28 stops the movement of the first brush 24 and the first beam 18 begins rotating back the other direction while the left side of the vehicle is washed by the first brush 24 as shown in FIGS. 22C-22F.

Figure 22D:
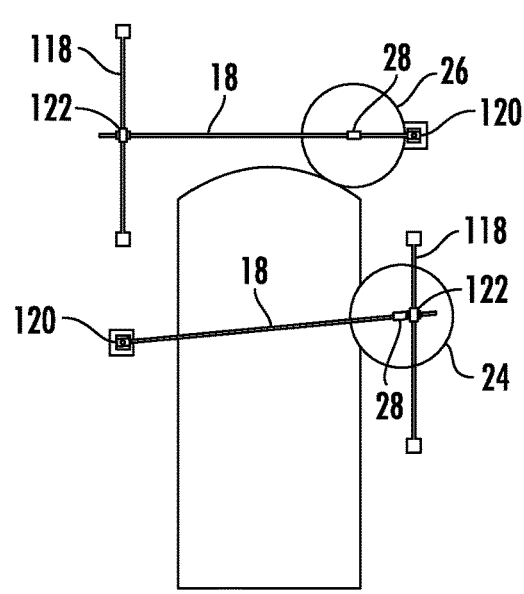
Figure 22E:
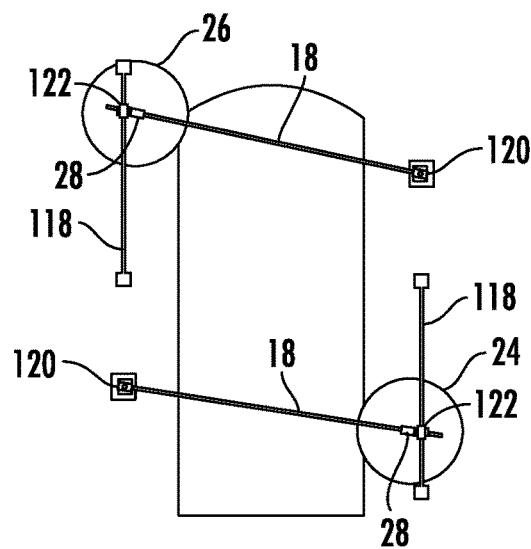
Figure 22F:
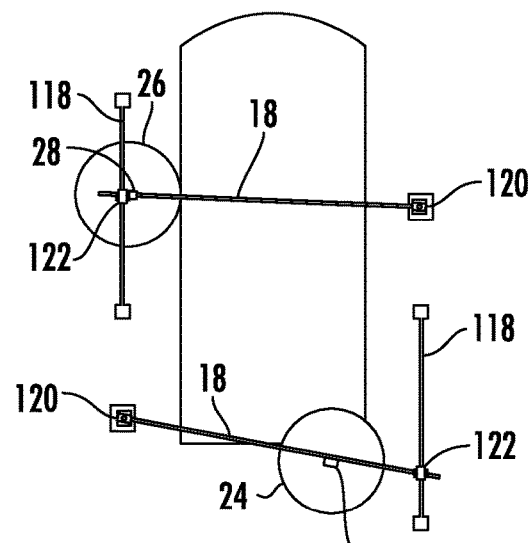
Figure 22G:
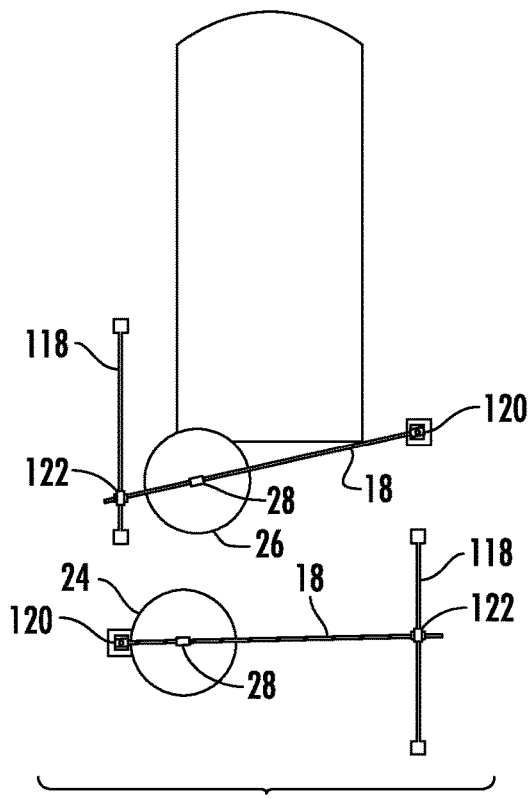
Figure 22H:
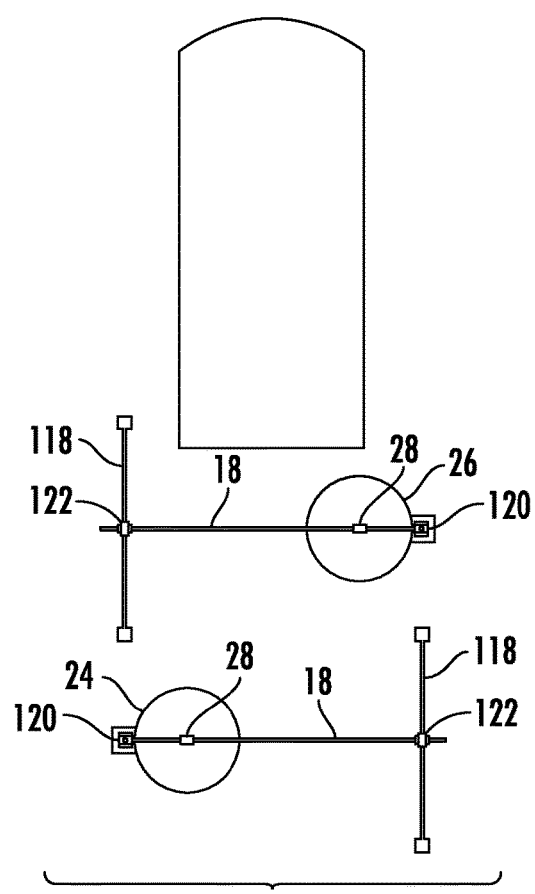

As shown in FIG. 22D, the opposite happens when the vehicles right front meets the second brush 26. The second beam 18 begins rotating to allow the second brush 26 to contact the entire front of the vehicle no matter the curvature of the vehicle. Once the second brush reaches the left side of the vehicle, the trolley 28 stops the movement of the second brush 26 and the second beam 18 begins rotating back the other direction while the right side of the vehicle is washed by the second brush 26 as shown in FIGS. 22F-22G.

When each of the brushes 24, 26 completes washing the right and left side of the vehicle, respectively, they begin to move back to their home positions by rotating the beams 18 back to their home orientation, that is perpendicular to vehicle movement, and the brushes 24, 26 translate back along the first and second beams 18 to their home positions. The speed of the brushes and the rotational speed of the beam movements are optimized to keep constant contact with the rear of the vehicle as it passes through the wash system.

The system as shown in FIGS. 22A-22H ensures that the front and rear of every vehicle may be washed by both the first and second brushes 24, 26, while reducing the number of brushes and beams. With this much overlap between the brushes 24, 26 at each of the front and rear, the risk of missing spots at these critical locations is minimized.

The process for the PID controller is given in FIGS. 22-29. The main flow of the control systems of the present disclosure. Generally speaking, the systems of the present disclosure are for commercial vehicle washing systems where a driver can drive a vehicle at a certain velocity through a vehicle washing system that is without a track and at potentially variable speed within a range of speeds, typically from about 1 mph to about 6 mph or any speed or range of speeds within this range. Conceivably the speeds could be faster and up to about 8 or 10 mph, but this would be atypical. Typically, the computer/server control system(s) of the present disclosure is a system that operates by reading brush power via variable frequency drive (VFD) into a proportional-integral-derivative (PID) controller where the output of the PID controller commands the forward or reverse velocity of the motor that drives the individual trolley back and forth. The PID controller is tuned in such a way to ensure that there is an appropriate amount of brush crush (the amount of brush actually contacting the vehicle) to ensure a good cleaning of the vehicle across the travel of the axis while the vehicle is moving through the system. The parameters going into the PID controller are controlled via a number of logic based functions that address the shortcomings of using simple PID control of a highly dynamic system that requires quick feedback adjustment without overshoot and oscillation.

As shown in FIG. 22, the PID controller is enabled when the brush contacts the vehicle initially. The PID controller then uses filtered power inputs and current position of the trolley in order to adjust the velocity of the trolley along the beam 18. Specific processes for max power limiting, power rate of change, initial brush contact detection, PID gains by position, Side PID gain, max velocity, and nulling of velocity are shown in FIGS. 23-29.

Figure 23:
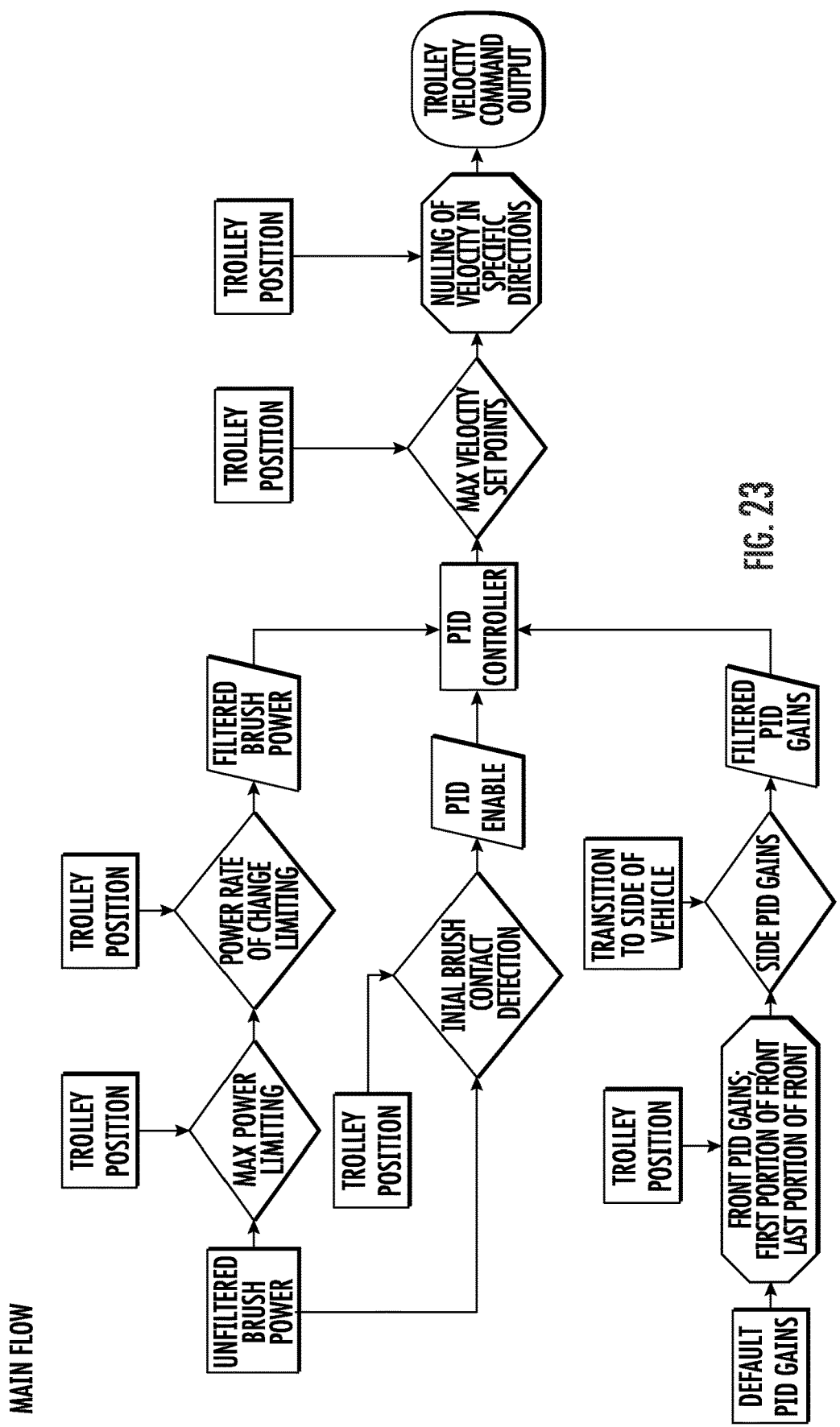
FIG. 23 is a flow chart detailing controller inputs and outputs of an embodiment of the vehicle wash system.

As shown in FIG. 23, the system also has the capability to sense and provide a maximum brush power to the brush(es) at various stages throughout the process. The maximum power function/process limits the maximum value of the brush power reading as the process input variable to the PID controller. The maximum value is changed as a function of the position of the trolley starting with a larger max value at start position and scaling down as the trolley moves away. This prevents the PID controller from building up excessive error that results in massive overshoot on the output velocity to the trolley motor. Additionally, it also filters out large spikes that are transient in nature. The maximum value is typically still held high enough to allow for the system to react responsively to an increase in speed of the car after the initial contact with a brush.

Figure 24:
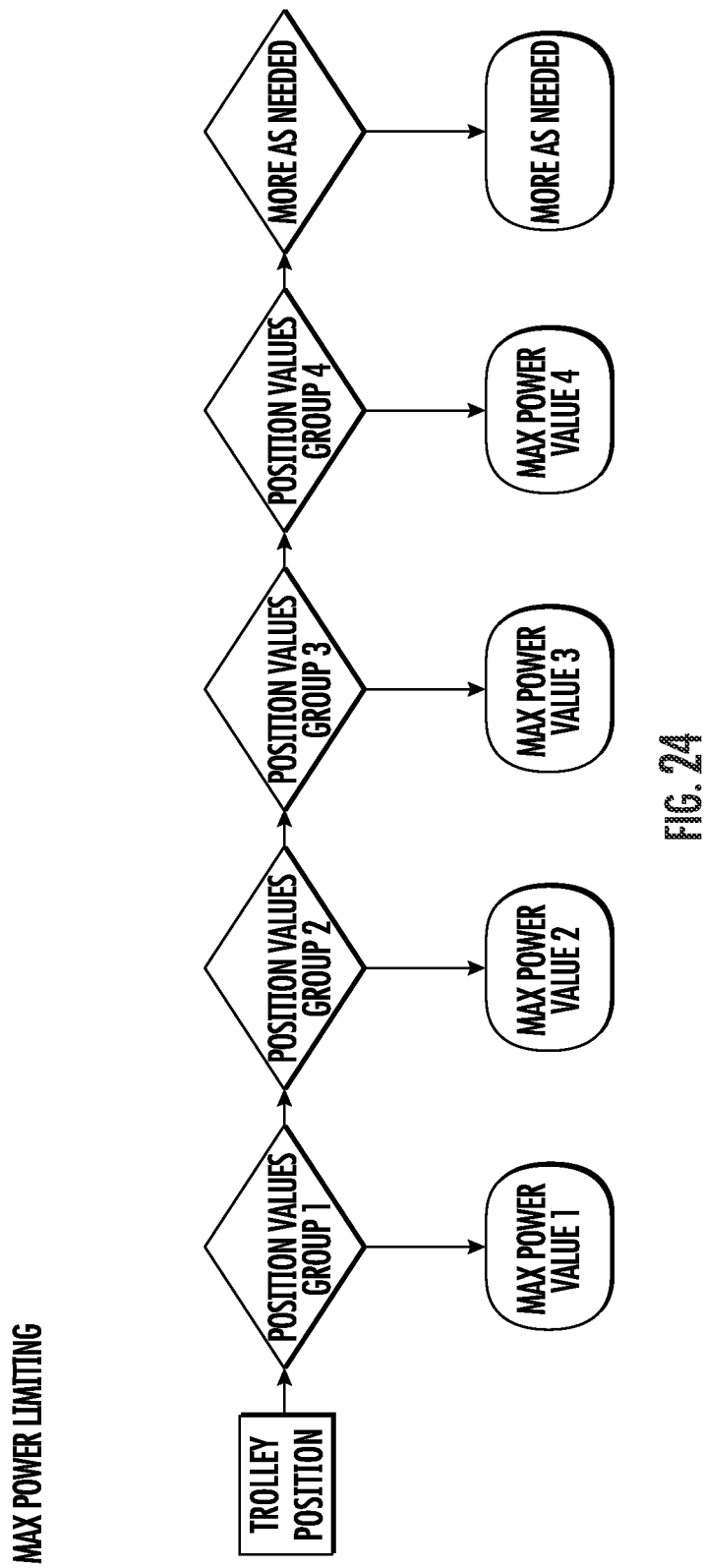
FIG. 24 is a flow chart detailing the max power limiting within the controller of an embodiment of the vehicle wash system.

As shown in FIG. 24, the systems of the present disclosure have the capability to regulate the incoming power readings from the individual motors used in connection with each trolley. This function limits the rate of change of incoming power reading from a brush. This helps to debounce and filter the incoming power readings. It also helps prevent the PID controller from building up an error so quickly (at a rate) that it produces overshoot in the output that would result in oscillations. The rate of change is controlled via two parameters: the amount of the change allowed per cycle and the cycle time length. These parameters can be set globally, for specific trolley positions, or for specific portions of the vehicle determined by other functions in the program that determine if the front, back, or side of the vehicle is being washed. These parameters must be set such that they strike a balance between the systems being responsive enough to the vehicle speed but not so sensitive that the system oscillates the output.

Figure 25:
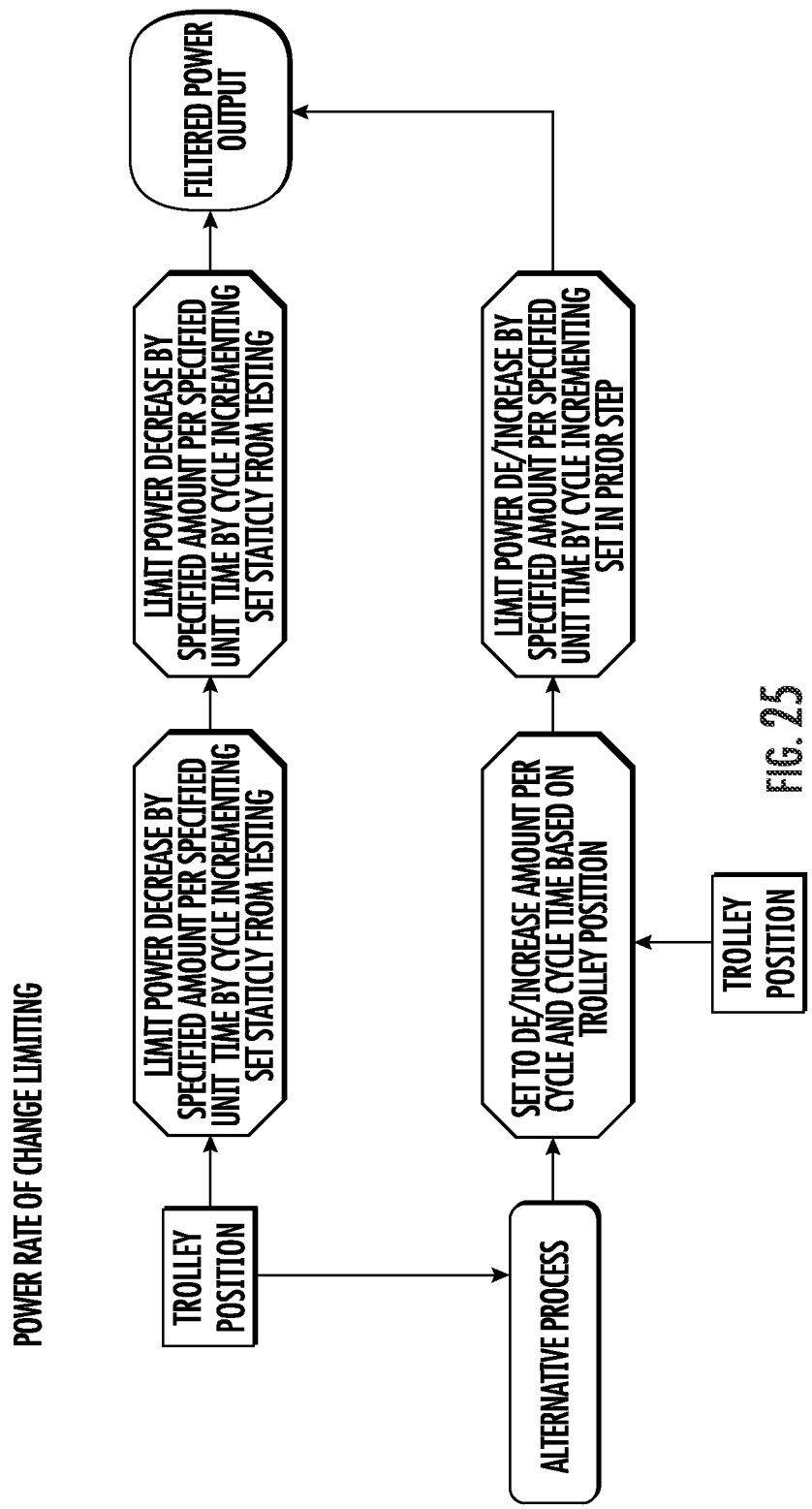
FIG. 25 is a flow chart detailing the power rate of change limiting within the controller of an embodiment of the vehicle wash system.
Figure 26:
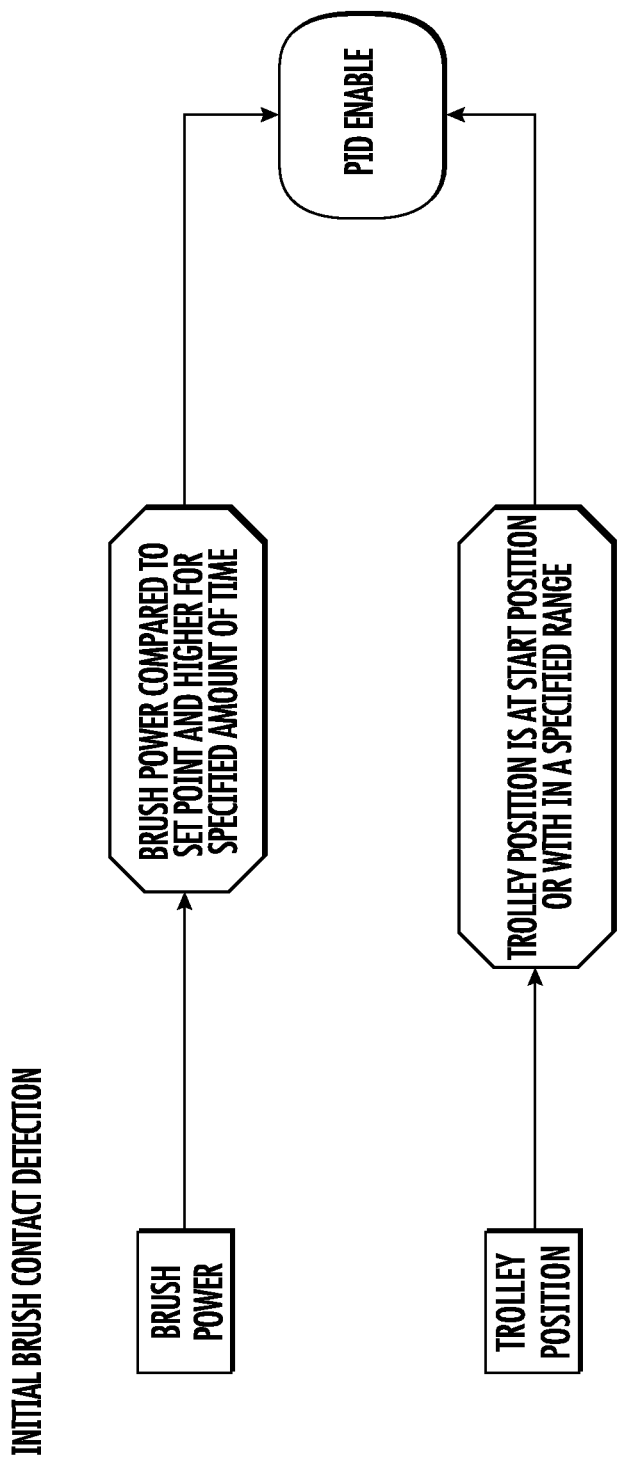
FIG. 26 is a flow chart detailing the initial brush contact detection within the controller of an embodiment of the vehicle wash system.

As shown in FIG. 25, the systems of the present disclosure also typically have the capability to detect when an initial brush contacts the vehicle. As shown in FIG. 25, the brush may be held in the starting position until the brush motor power rises above a specific value, which enables the PID controller and, in turn, allows the trolley to start moving. This function specifically only allows the PID controller to be enabled when the brush is in the starting position. This function allows for the brush to stay stationary while waiting for the car as the free spinning power reading is much lower than the power reading when the brush is in contact with the car/vehicle at the specified amount of brush crush needed for proper cleaning. The brush power value that is used enables the PID controller to be set to help control how reactive the system is to the initial brush contact with the vehicle. By setting the value lower, the PID controller becomes active sooner in the brush vehicle contact process and by setting it higher the PID controller will become active later in the brush contact process. This has many effects on the brush power filtering functions.

Figure 27:
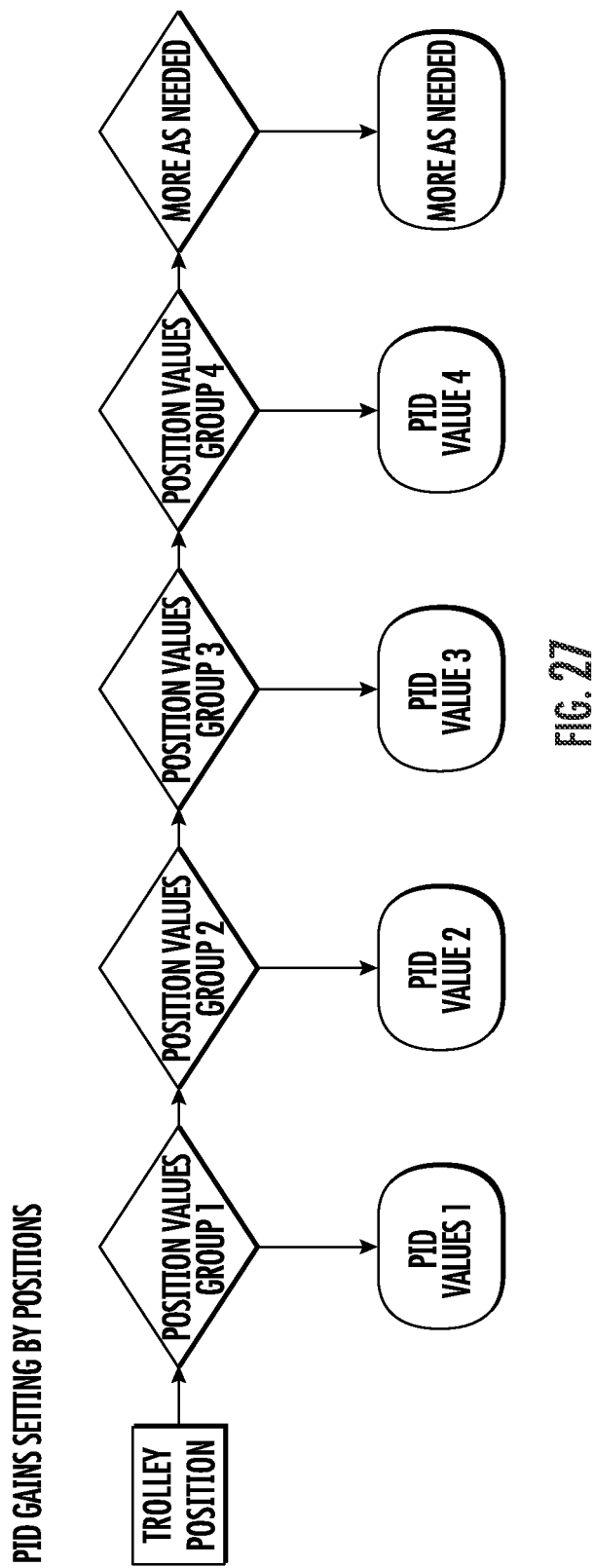
FIG. 27 is a flow chart detailing the PID gains setting by positions within the controller of an embodiment of the vehicle wash system.

As shown in FIG. 27, the systems of the present disclosure also have the ability to set different PID gains based on the trolley position. By detecting the transition from the front to the side or the side to the back the systems of the present disclosure adjust the responsiveness of the PID controller. This ensures that the brush is kept in contact with the vehicle and prevents oscillations due to the change in vehicle profile depending on the portion of the vehicle being washed by the brush. Significantly, the transition between the front, side and rear of the vehicle are detected by the system looking for a specific amount of drop in brush power. This can be significant for a number of reasons. For example, using more reactive PID gains on the first portion of the front of a car allows the brush to get moving quickly, but then move to normal values in the middle of the front to ensure that the brush doesn't overshoot the end of the car/vehicle. Additionally, on the sides of the vehicle the PID gains can be set to very conservative/lower values to ensure the brush does not bounce when it encounters the change in brush contact such as when encountering side mirrors or when the brush encounters the transition between the hood and the passenger compartment and then onto to the rear section of the vehicle side. On the rear of the vehicle different PID gains are used to help with keeping the brush in contact with the rear of the vehicle as it moves away from the brush.

Figure 28:
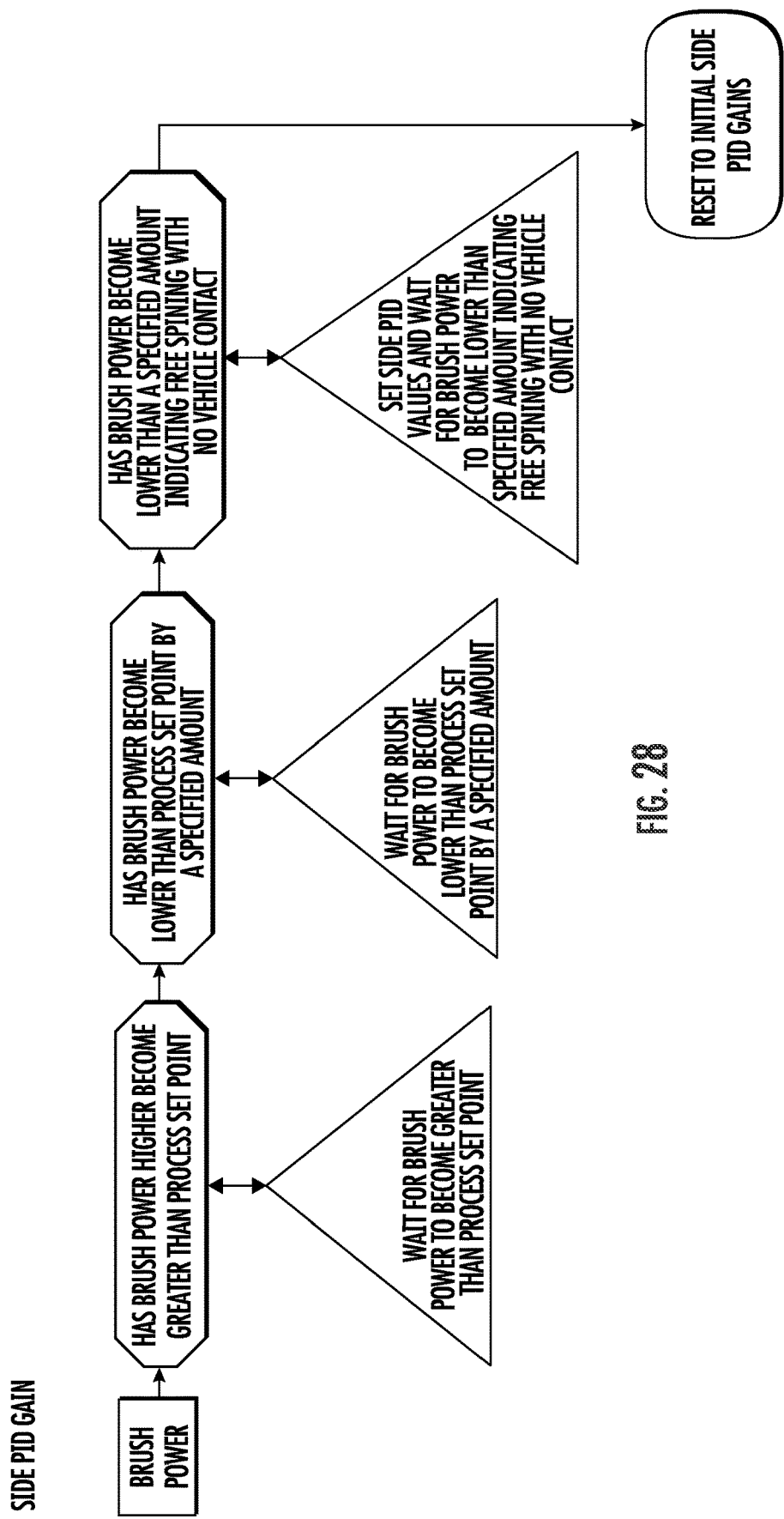
FIG. 28 is a flow chart detailing the side PID gain within the controller of an embodiment of the vehicle wash system.

As shown in FIG. 28, the systems can limit the max velocity by trolley position, which helps keep the trolley from moving too fast at the extremes of the axis thereby helping to prevent end stop strikes and erroring of the trolley motion system. Also, using position-based limiting of the maximum velocity of the trolley(s) allow(s) for more aggressive PID gains to be used, but by limiting the maximum velocity oscillations can be damped as the system will not be able to build up as much speed. Maximum velocity set points are also useful for controlling the behavior of the trolley on different portions of the vehicle. An example of this is down the side of the vehicle the max velocity is limited lower to keep the brush in closer contact by damping oscillations. Another example is increasing the max velocity once the side is done to allow the brush to either move back to the home position quickly or to allow faster movement to keep up with the rear of the vehicle and ensure a better washing of the rear of the vehicle.

Figure 29:
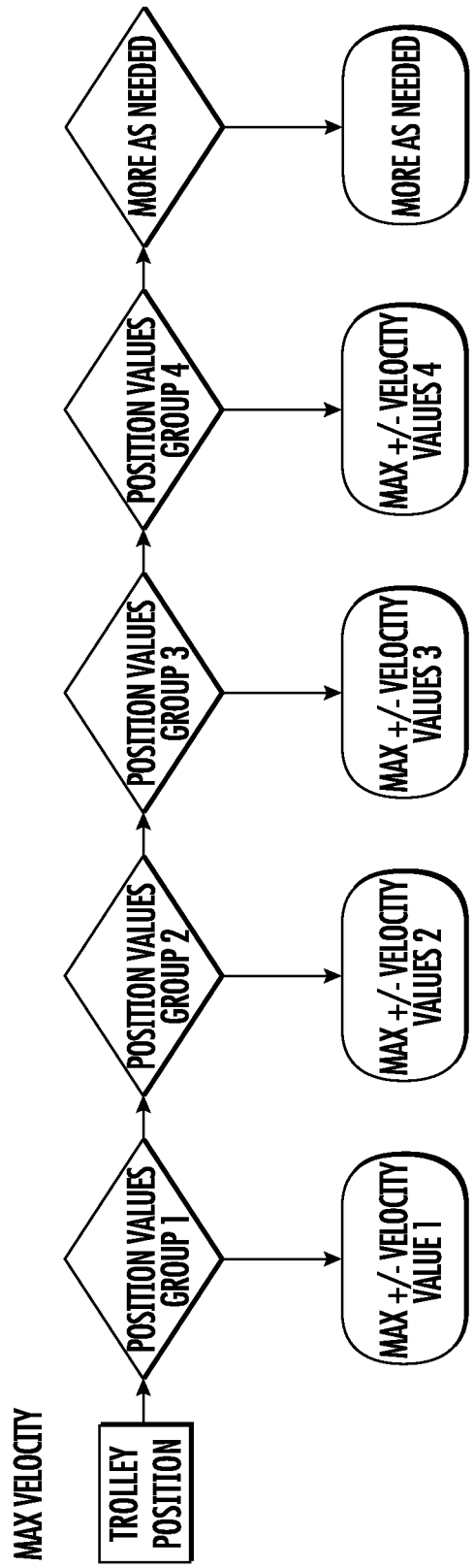
FIG. 29 is a flow chart detailing the max velocity within the controller of an embodiment of the vehicle wash system.

As shown in FIG. 29, the systems of the present disclosure have the ability to null the velocity of the trolley(s). Nulling of the velocity in a specific direction allows for controlling which way the brush can move in response to the velocity command output from the PID controller. This is useful for controlling the movement of the brush back to the home position, the brush only needs to move in one direction when moving back home and specifically limiting it to one direction of movement prevents unexpected behavior. Additionally, it is also used when the brush reaches an end stop to prevent the brush from being jogged further into the end stop causing motion axis errors. Another example is preventing back movement in the first stage of vehicle contact with the brush, this helps to limit oscillations at the start of movement.

It will be understood by one having ordinary skill in the art that construction of the described disclosure and other components is not limited to any specific material. Other exemplary embodiments of the disclosure disclosed herein may be formed from a wide variety of materials, unless described otherwise herein. Typically, the systems of the present disclosure are typically produced from plastic components, various sensors, and metal materials, but the particular materials used are often not critical, but generally speaking lighter materials that remain sturdy are most preferred given the portable and retrofittable nature of the devices and systems of the present disclosure.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all sub-ranges beginning with a minimum value of 1 or more and ending with a maximum value of 10 or less (e.g., 1 to 6.1, or 2.3 to 9.4), and to each integer (1, 2, 3, 4, 5, 6, 7, 8, 9, 10) contained within the range. In this specification and the appended claims, the singular forms "a," "an" and "the" include plural reference unless the context clearly dictates otherwise. All combinations of method steps or process steps as used herein can be performed in any order, unless otherwise specified or clearly implied to the contrary by the context in which the referenced combination is made.

The devices and systems of the present disclosure described herein, including but not limited to: a set of independently driven trolleys carrying at least one vehicle washing brush extending downward therefrom that is dynamically controlled to adjust to vehicle speed through the washing system while maintaining wash quality and avoiding damage to the vehicle being washed and the system itself. They systems the present disclosure also typically do not employ a vehicle moving track system to regulate the speed of the vehicle being washed by the system, but instead are typically able to wash vehicles driven through the systems at slow, typically at a constant speed but also at potentially variable speeds during the vehicle washing process. The present disclosure is also generally related to the corresponding manufacturing methods. All of the devices, systems, and methods may comprise, consist of, or consist essentially of the elements of the products as described herein, as well as any additional or optional element described herein or otherwise useful in medical device and health tracking information systems. "Consisting essentially of" in the context of the claims of this application limits the scope of a claim or claim element to the specified materials or steps "and those that do not materially affect the basic and novel characteristic(s)" of the claimed invention as would be known by those of ordinary skill in the art whether or not such a composition is disclosed in the application or not as affecting the basic and novel characteristic.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the Applicant intends to indicate "only A or B but not both" then the term "only A or B but not both" will be employed. Thus, use of the term "or" herein is the inclusive, and not the exclusive use. Also, to the extent that the terms "in" or "into" are used in the specification or the claims, it is intended to additionally mean "on" or "onto."

The systems of the present disclosure typically include: the vehicle washing system(s) of according to any of the above-discussed embodiments of the present disclosure typically incorporate the vehicle washing systems and also typically a remotely located server system that is connected via a wired or wireless signal connection to a local computer system that may be any handheld mobile computing device such as a mobile phone with a touch screen data input, a tablet device with a touch screen and/or keyboard data input, a laptop computer system or a desktop computer system or conceivably another server system. The remotely located server system may be configured to: analyze any set or subset of one or more type of data such that alerts may be transmitted to any assigned individual or multiple people when a negative event is observed or when an anticipated maintenance issue has been identified by the algorithms of the present disclosure that monitor the use and health of the various components of the vehicle wash systems of the present disclosure. For example, when a motor driving one of the brushes begins to respond in a slower than typical fashion than previously done over a period of time, the system will send a warning to an individual or a set of people advising of the potential maintenance issue and proactively, typically automatically, a replacement part to the location of the vehicle wash system. The system of the present disclosure may also coordinate the timing of the delivery of a replacement part with the arrival of a maintenance professional that is qualified to install the part or repair the portion of the overall system that was automatically detected as potentially faulty. Alternatively, the system can simply send a maintenance/repair professional to investigate the status and health of the part, portion of the system or entire vehicle washing system based on data seen by the system. The systems of the present disclosure may be networked with a plurality of different systems located in different locations and potentially owned by different owners or users to enable a gathering of greater amounts of data in different geographic locations that may be used by an artificial intelligence computer system to analyze the data and provide improved predictive maintenance customer service. The output from the analysis of the artificial intelligence compiling computer system is enhanced by collecting more data based on the feedback and sensed parameters of the vehicle washing systems over time. Accordingly, the present invention also includes a method of proactively providing maintenance parts and service based on sensed parameters of the vehicle brush assembly/washing system based on data from one or a plurality of vehicle brush assembly/washing systems in one or a plurality of locations.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. An apparatus to wash a vehicle in a vehicle wash as the vehicle moves through the vehicle wash, comprising:
   a trolley frame comprising a first support beam and a second support beam, the trolley frame defining a first reference frame;
   a first translation beam extending from the first support beam to the second support beam, wherein the first translation beam is at an angle other than 90° with respect to the first reference frame;
   a second translation beam extending from the first support beam to the second support beam, wherein the second translation beam is at an angle other than 90° with respect to the first reference frame;
   a first brush extending downward from a first trolley, the first trolley movably disposed on the first translation beam;
   a second brush extending downwardly from a second trolley, the second trolley movably disposed on the second translation beam wherein the second trolley moves independently from the first trolley;
   wherein the first brush is configured to contact a near front corner of the vehicle, traverse across a front side of the vehicle, stop on a far front corner of the vehicle, and remain stationary while contacting a far side of the vehicle; and
   wherein the second brush is configured to remain stationary while contacting a near side of the vehicle, traverse across a rear of the vehicle upon reaching a near rear corner of the vehicle, and stop upon reaching a far rear corner of the vehicle;
   at least one controller;
   wherein the first translation beam and the second translation beam are parallel;
   wherein the first trolley includes:
      (1) a first trolley moving motor that moves the first trolley along the first translation beam; and
      (2) a first trolley brush motor within the first trolley that rotates the first brush;
   wherein the second trolley includes:
      (1) a second trolley moving motor that moves the second trolley along the second translation beam; and
      (2) a second trolley brush motor within the second trolley that rotates the second brush;
   wherein the first trolley brush motor provides first trolley brush feedback data to the at least one controller;
   wherein the second trolley brush motor provides second trolley brush feedback data to the at least one controller;
   wherein the at least one controller provides instructions to the first trolley moving motor that moves under its own power to drive the first trolley based on the first trolley brush feedback data;
   wherein the second trolley moving motor moves under its own power to drive the second trolley moving motor based on the second trolley brush feedback data;

wherein the first trolley brush feedback data comprises an amount of power used to spin the first brush and the second trolley brush feedback data comprises an amount of power used to spin the second brush;

wherein the first trolley has a first trolley variable speed and the second trolley has a second trolley variable speed; and wherein the first trolley variable speed and the second trolley variable speed are controlled by the at least one controller, and wherein the at least one controller changes the first trolley variable speed independently and based upon the first trolley brush feedback data and wherein the at least one controller changes the second trolley variable speed independently and based according to the second trolley brush feedback data; and wherein the apparatus is free of a system that pushes or pulls the vehicle through the apparatus and wherein the apparatus cleans an exterior of the vehicle as the vehicle moves through the system; and wherein the first trolley variable speed and the second trolley variable speed are determined by the equation:

(Carriage Speed)=(Vehicle speed)/Sin($\alpha$)

wherein $\alpha$ is the angle between the first translation beam and the first reference frame or the second translation beam and the first reference frame.

2. The apparatus of claim 1 further comprising a third translation beam that is parallel to the first translation beam and a fourth translation beam that is parallel to the second translation beam and wherein the first trolley is independently driven along the first translation beam and the third translation beam and the second trolley is independently driven along the second translation beam and the fourth translation beam and wherein the first trolley and the second trolley to not contact one another or share any component that is part of a travel pathway of the other trolley.

3. The apparatus of claim 2, wherein the third translation beam is offset at a first distance from the first translation beam and the fourth translation beam is offset at a second distance from the second translation beam.

4. The apparatus of claim 3, wherein the at least one controller is a programmable logic controller or a PID controller and the at least one controller is a first controller located on the first trolley and a second controller located on the second trolley and wherein the first and second distances are equal.

5. The apparatus of claim 4, wherein the first and second distances are based on a width of the first and second trolleys.

6. The apparatus of claim 3, wherein each of the first and second trolleys further comprise at least one wheel configured to roll on at least one translation beam.

7. The apparatus of claim 1 further comprising at least one standing post, wherein at least one of the first support beam and the second support beam are located by the at least one standing post.

8. The apparatus of claim 1, wherein the first translation beam is rotational about a longitudinal axis of the first translation beam.

9. The apparatus of claim 8, further comprising a bearing and cup connection between the first translation beam and the first support beam.

10. The apparatus of claim 1, wherein the second translation beam is rotational about a longitudinal axis of the second translation beam.

11. The apparatus of claim 10, further comprising a bearing and cup connection between the second translation beam and the second support beam.

12. The apparatus of claim 1, further comprising a top brush assembly rotationally disposed in front of the first and second brush and wherein the apparatus cleans the exterior of the vehicle as the vehicle moves through the system at a variable speed up to 10 mph as the vehicle travels through the system.

13. The apparatus of claim 12, wherein the top brush assembly comprises a top brush frame, a top brush, and a counter-weight.

14. The apparatus of claim 13, wherein the top brush and the counter-weight are disposed on opposite sides of a rotational axis of the top brush assembly.

15. The apparatus of claim 1, wherein the first translation beam is arch-shaped and the second translation beam is arch-shaped and the first trolley travels in a counterclockwise direction when washing the vehicle and the second trolley travels in a clockwise direction when washing the vehicle.

* * * * *